United States Patent
Koga et al.

(10) Patent No.: US 10,494,027 B2
(45) Date of Patent: Dec. 3, 2019

(54) CRASH ENERGY ABSORBING PART

(71) Applicant: NIPPON STEEL & SUMITOMO METAL CORPORATION, Tokyo (JP)

(72) Inventors: Atsuo Koga, Tokyo (JP); Kenichiro Tadokoro, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 99 days.

(21) Appl. No.: 15/039,785

(22) PCT Filed: Nov. 26, 2014

(86) PCT No.: PCT/JP2014/081180
§ 371 (c)(1),
(2) Date: May 26, 2016

(87) PCT Pub. No.: WO2015/080129
PCT Pub. Date: Jun. 4, 2015

(65) Prior Publication Data
US 2016/0347370 A1    Dec. 1, 2016

(30) Foreign Application Priority Data
Nov. 27, 2013  (JP) .................... 2013-245092

(51) Int. Cl.
*B62D 21/15*   (2006.01)
*F16F 7/12*   (2006.01)

(52) U.S. Cl.
CPC ............. *B62D 21/15* (2013.01); *F16F 7/12* (2013.01)

(58) Field of Classification Search
CPC .... F16F 7/12; F16F 7/123; F16F 7/122; F16F 7/003; B62D 21/15; B62D 1/11; B62D 1/192; B62D 21/157
See application file for complete search history.

(56) References Cited

U.S. PATENT DOCUMENTS 3,930,665 A * 1/1976 Ikawa ................. B60R 21/045
                                                            180/90
7,806,448 B2 * 10/2010 Allen ..................... B60R 19/18
                                                            293/120
(Continued)

FOREIGN PATENT DOCUMENTS

CN    1387615 A   12/2002
CN    1443108 A    9/2003
(Continued)

OTHER PUBLICATIONS

International Search Report for PCT/JP2014/081180 dated Jan. 6, 2015.
(Continued)

*Primary Examiner* — Bradley T King
*Assistant Examiner* — Mahbubur Rashid
(74) *Attorney, Agent, or Firm* — Birch, Stewart, Kolasch & Birch, LLP

(57) ABSTRACT

To provide a crash energy absorbing part which is light in weight, and in which collapsing deformation into a bellows shape occurs more stably even when a crash load is applied in a direction crossing the shock-absorbing direction of the crash energy absorbing part. The crash energy absorbing part of the present invention is constructed of a member that is obtained by forming a sandwich metal sheet (1), which is formed by laminating a surface layer (3A, 3B) formed of a metal sheet on each side surface of a core layer (5) and bonding them. By controlling a deformation rate of a center layer of the sandwich metal sheet (1) for constructing the crash energy absorbing part, the crash energy absorbing part of the present invention is deformed at a short wavelength regardless of a direction of a crash load that is applied, whereby collapsing deformation into a bellows shape more stably occurs.

8 Claims, 15 Drawing Sheets

(A)  (B)  (C)  (D)

(E)

(56) References Cited

U.S. PATENT DOCUMENTS

| | | | | |
|---|---|---|---|---|
| 2003/0080573 | A1* | 5/2003 | Marijnissen | B60R 19/18 293/132 |
| 2013/0143041 | A1* | 6/2013 | Mathias | C08L 97/02 428/355 R |

FOREIGN PATENT DOCUMENTS

| | | | |
|---|---|---|---|
| CN | 201109971 Y | 9/2008 | |
| CN | 102811639 A | 12/2012 | |
| CN | 102834641 A | 12/2012 | |
| DE | 102012101777 A1 | 9/2013 | |
| EP | 1106861 A1 * | 6/2001 | F16F 7/12 |
| EP | 2966312 A1 | 1/2016 | |
| JP | 6-101732 A | 4/1994 | |
| JP | 9-277953 A | 10/1997 | |
| JP | 2006-46481 A | 2/2006 | |
| JP | 2006-207724 A | 8/2006 | |
| JP | 2011-218935 A | 11/2011 | |

OTHER PUBLICATIONS

Kusaka et al., "Plastic Buckling Behavior of Thin-Walled Cylindrical Shells under Impact Loading", <OS0905>, The Japan Society of Mechanical Engineers, M & M 2008 Mechanics of Materials Conference, Sep. 16-19, 2008.
Umezaki et al., "Dynamic Buckling Modes and Energy Absorption of Thin-Walled Tubular Steel Specimens", The Japan Society of Mechanical Engineers, Mar. 2005.
Written Opinion of the International Searching Authority for PCT/JP2014/081180 (PCT/ISA/237) dated Jan. 6, 2015.
Chinese Office Action and Chinese Search Report, dated Feb. 13, 2017, for corresponding Chinese Application No. 201480064776.8, with an English translation of the Chinese Office Action.
Extended European Search Report issued in corresponding European Application No. 14866097.0, dated May 17, 2017.
Indian Office Action for Indian Application No. 201617017939, dated Apr. 29, 2019, with English translation.
Thai Office Action, dated Aug. 8, 2019, for Thai Application No. 1601003022 is provided, along with a statement of relevance.
European Office Communication pursuant to Article 94(3) EPC dated Mar. 7, 2018 for corresponding European Application No. 14866097.0.

* cited by examiner (A)  (B)

(A)  (B)

(A)  (B)  (C)

(A)

(B)

(A)

(B)

(A)

(B)

(A)　　　　　　　　　　　　(B)

(A)

(B)

CRASH ENERGY ABSORBING PART

TECHNICAL FIELD

The present invention relates to a crash energy absorbing part which may be used in transport vehicles such as automobiles.

BACKGROUND ART

Safety level of transport vehicles has been increasing every year, and it is essential to protect occupants in a cabin even if the function of the transport vehicle is damaged in collision. Therefore, in order to make a frame around the cabin absorb the energy that is generated in collision and reduce the shock transmitted to the cabin, a high strength steel sheet is actively used for the frame, whereby the collision safety is improved.

Moreover, in recent years, considering the repairability after collision in addition to the collision safety, a vehicle type, in which an exchangeable crash energy absorbing part such as a crash box is used for absorbing the shock, has been increased. This crash energy absorbing part may be mounted at a front surface and a rear surface of a cabin so that the shock-absorbing direction of the crash energy absorbing part is in a longitudinal direction of an automobile. The crash energy absorbing part is collapsingly deformed into a bellows shape in the shock-absorbing direction in collision and thereby absorbs the crash energy. Although it slightly differs depending on the vehicle type, there is a limitation in the shape of the crash energy absorbing part due to the space where the crash energy absorbing part is to be arranged.

Here, as shown by the views (A) to (E) in FIG. 1, the collapsing deformation into the bellows shape is performed by repeating deformation such that buckling creases bw, which are formed at a certain buckling wavelength H, are folded. Other than this deformation, there are cases in which the entirety of a part is bent, whereby deformation occurs unstably. In such deformation, the crash energy is difficult to absorb sufficiently.

Furthermore, a collision of an automobile does not necessarily occur in a direction parallel to the shock-absorbing direction of the crash energy absorbing part. Therefore, the crash energy must be absorbed even when a crash load is applied in a direction crossing the shock-absorbing direction (for example, a direction that is oblique to the shock-absorbing direction by an intersection angle of 10 degrees).

Accordingly, a crash energy absorbing part is required to be made so that the collapsing deformation into the bellows shape will occur reliably and stably regardless of the direction of a crash load that is applied, from the viewpoint of absorbing all crash energy, which is generated in a light collision (for example, a collision occurring at the speed of 15 km/hour), and thereby preventing damages to other members. In addition, it is very important to reduce the weight of a member from the viewpoint of improvement in fuel efficiency.

Techniques for strictly controlling the material and the shape parameters of a crash energy absorbing part have been developed heretofore in order to make the crash energy absorbing part so that the collapsing deformation into the bellows shape will occur more stably.

For example, according to Non-Patent Literature 1, the behavior of collapsing of a thin cylindrical member which receives a compressive load in an axial direction is controlled by a ratio $\sigma y/E$, in which $\sigma y$ represents yield stress of a material and E represents a longitudinal elastic coefficient (Young's modulus). In this case, when the ratio $\sigma y/E$ is small, an axial symmetric buckling mode tends to occur, and when the ratio $\sigma y/E$ is great, an axial asymmetric buckling mode tends to occur.

Also, according to Non-Patent Literature 2, regarding the behavior of collapsing of a thin cylindrical member, the collapsing mode is changed by a ratio d/t of a diameter "d" of the member and the thickness "t" of the member.

On the other hand, Patent Literature 1 discloses a technique for configuring a crash energy absorbing part to be collapsingly deformed into a bellows shape. In this case, the crash energy absorbing part has a cross section of a polygon shape of a rectangle or more, and a ratio t/M of the thickness "t" and a circumferential length M of the cross section is controlled to be not less than 0.0025.

Patent Literature 2 also discloses a technique for configuring a crash energy absorbing part to be collapsingly deformed into a bellows shape. In this case, the crash energy absorbing part has a polygonal cross section, and a ratio of lengths of adjacent sides among the sides of the polygon of the cross section is controlled to be not greater than 2.3.

The above techniques of strictly controlling the material and the shape parameters of the crash energy absorbing part are findings that are effective for configuring a crash energy absorbing part, which is made of an ordinary metal material, to be collapsingly deformed into a bellows shape. However, in the case of a crash energy absorbing part that is constructed of a sandwich metal sheet, in which a surface layer that is formed of a metal sheet is laminated on each side surface of a core layer and is bonded together, it is difficult to provide a crash energy absorbing part by fully utilizing the following characteristics of the sandwich metal sheet, only by controlling the material and the shape parameters as described above. That is, the sandwich metal sheet is light in weight compared to a metal sheet and can be deformed at a short buckling wavelength.

It is reported that a crash energy absorbing part that is constructed of a sandwich metal sheet is collapsingly deformed into a bellows shape at a short buckling wavelength by controlling a ratio of the Young's modulus of the metal sheet of a surface layer and the Young's modulus of a core layer. The mechanism of this deformation is described below.

Since the core layer restricts the metal sheet on each surface of the core layer by bonding, the sandwich metal sheet can be modeled by two metal sheets 12 which are restricted relative to each other by elastic springs 11 (the view (A) in FIG. 2). Although a degree of freedom of deformation of the metal sheet 12 is different, the collapsing deformation mode of each of the two metal sheets 12 is equivalent to the collapsing deformation mode of a metal sheet 12 on an elastic floor 13 (the view (B) in FIG. 2). The elastic floor 13 corresponds to restricting elastic springs. Both of the two metal sheets 12 (the view (A) in FIG. 2) that are restricted by the elastic springs 11 are unfixed, whereas only the metal sheet 12 (the view (B) in FIG. 2) on the elastic floor 13 is unfixed. Therefore, the deformation of the elastic springs 11 corresponds to shear deformation in the case of collapsingly deforming the two metal sheets 12 that are restricted by the elastic springs 11, and the deformation of the elastic springs 11 corresponds to elongation deformation in the case of collapsingly deforming the metal sheet 12 on the elastic floor 13. Nevertheless, the collapsing energy is absorbed by the deformation of the elastic body and the deformation of the metal sheet in each of the cases. In this case, the deformation is performed so that the total of the deformation energy will be the minimum. When the metal sheet 12 of the surface layer is deformed at a buckling wavelength $H_1$ (the view (C) in FIG. 2), which is equal to the length of the straight portion of the metal sheet 12, an energy $e_r$ is the minimum. On the other hand, in the deformation of the elastic floor, the energy can be made smaller when the elongation is made as small as possible. Thus, when the metal sheet 12 is deformed at a short buckling wavelength $H_2$ as shown in the view (D) in FIG. 2, an energy $e_c$ is the minimum. Accordingly, the buckling wavelength of the sheet on the elastic floor depends on the balance of the amount of the energy $e_c$ and $e_f$ and is thereby a value which is smaller than the bucking wavelength $H_1$ and is greater than the buckling wavelength $H_2$ (the views (C) and (D) in FIG. 2).

The sandwich metal sheet is collapsingly deformed at a short buckling wavelength by the same principle as in the case in FIG. 2. That is, in the surface layer, the deformation energy is small when the surface layer is deformed at a long buckling wavelength, whereas in the core layer, the deformation energy is small when the core layer is deformed at a short buckling wavelength. The sandwich metal sheet is deformed at a buckling wavelength, at which the amount of the deformation energy of the surface layer and the core layer is balanced and the total of the deformation energy of the surface layer and the core layer will be minimum. Since the core layer is deformed at a short buckling wavelength because the deformation energy is decreased, a crash energy absorbing part that is constructed of the sandwich metal sheet is collapsingly deformed at a shorter wavelength compared to a crash energy absorbing part that is made of a single material. However, in a sandwich metal sheet, in which a core layer has a high Young's modulus, and in which a hardly deformable material such as a brazing material is used as a bonding material, the core layer is hardly deformed and is difficult to deform at a short buckling wavelength. Therefore, in such a crash energy absorbing part, the collapsing deformation into the bellows shape may not occur stably.

In another example, Patent Literature 3 discloses a crash energy absorbing part which has a polygonal closed cross section with an inwardly recess portion, and in which a bending moment is differentiated at a part of the cross section. By forming such a complicated cross sectional shape, the buckling wavelength is made short, the collapsing deformation into the bellows shape stably occurs even in a collision from an oblique direction, and the crash energy is absorbed sufficiently. However, this technique can be used in the case of using a metal sheet. Therefore, if a sandwich metal sheet is formed into the same complicated shape as in the above technique, there is a high probability that a forming defect such as rupture of a surface layer occurs in the forming and a desired shape is not obtained.

As described above, in general, the material and the shape parameters of a crash energy absorbing part are controlled so that the crash energy absorbing part will be collapsingly deformed into a bellows shape even when an impact is applied in a direction crossing the shock-absorbing direction of the crash energy absorbing part. However, a technique for improving the fuel efficiency of a transportation vehicle and for obtaining sufficient absorbable amount of the crash energy by forming a crash energy absorbing part with a light weight material and making collapsing deformation into a bellows shape occur more stably, has not yet been developed.

CITATION LIST

Patent Literature

Patent Literature 1: JP H9-277953A
Patent Literature 2: JP 2011-218935A
Patent Literature 3: JP 2006-207724A Non-Patent Literature Non-Patent Literature 1: Materials & Mechanics Conference 2008, "OS0905-1"–"OS0905-2"
Non-Patent Literature 2: Journal of the Japan Society of Mechanical Engineers Kansai branch, 2005 (80)

SUMMARY OF INVENTION

Technical Problem

An object of the present invention is to provide a crash energy absorbing part which is light in weight, and in which collapsing deformation into a bellows shape occurs more stably even when a crash load is applied in a direction crossing the shock-absorbing direction of the crash energy absorbing part.

Solution to Problem

The inventors of the present invention researched the crash energy absorbing part which is constructed of a sandwich metal sheet in more detail in order to solve the above problem. As a result, the inventors of the present invention found that there is a probability that in a sandwich metal sheet, in which a core layer has a high Young's modulus, and in which a hardly deformable material such as a brazing material is used as a bonding material, collapsing deformation into a bellows shape does not stably occur depending on the direction of a load that is applied, because the core layer is hardly deformed and is difficult to deform at a short buckling wavelength.

Then, the inventors of the present invention conducted an intensive research on the problem and concluded that the deformation of a layer, which is formed of the core layer and the bonding layers, should be strictly controlled because the deformation characteristics of the bonding layers are also important parameters in order to make the sandwich metal sheet so that collapsing deformation will occur more stably at a short buckling wavelength.

The inventors of the present invention and found the following items as a technique for solving the above problem that is specific to the sandwich metal sheet providing a crash energy absorbing part which is light in weight, and in which collapsing deformation into a bellows shape occurs more stably even when a crash load is applied in a direction crossing the shock-absorbing direction of the crash energy absorbing part.

(1)

A crash energy absorbing part configured to absorb crash energy when a crash load is applied to one of end portions in a shock-absorbing direction of the crash energy absorbing part, the crash energy absorbing part being constructed by forming a sandwich metal sheet including surface layers and a core layer, in which each of the surface layers is formed of a metal sheet, and the surface layer is laminated on each surface of the core layer and is bonded together, wherein the center layer other than the surface layers has a deformation rate of not less than 7.0% and not greater than 75.0%, and the deformation rate is a rate of decrease in flexural rigidity, which is measured by an experiment, from a calculated rigidity, which is calculated based on the structure of the sandwich metal sheet.

(2)

The crash energy absorbing part according to (1), wherein each of the surface layers is formed of a metal sheet which has a Young's modulus that is greater than the Young's modulus of the core layer, and wherein a thickness ratio $t_c/t_f$ of the thickness $t_f$ of each of the surface layers and the thickness $t_c$ of the core layer is not less than 2.0 and not greater than 7.0.

(3)

The crash energy absorbing part according to (1), wherein each of the surface layers is formed of a metal sheet which has a Young's modulus that is greater than the Young's modulus of the core layer, and wherein a thickness ratio $t_c/t_f$ of the thickness $t_f$ of each of the surface layers and the thickness $t_c$ of the core layer is not less than 3.5 and not greater than 5.0.

(4)

The crash energy absorbing part according to (1), wherein a ratio $E_f/E_c$ of the Young's modulus $E_f$ of each of the surface layers and the Young's modulus $E_c$ of the core layer is not less than $1 \times 10^{-3}$ and not greater than $1 \times 10^{-1}$.

(5)

The crash energy absorbing part according to (1), wherein the deformation rate of the center layer is not less than 7.0% and not greater than 50.0%.

(6)

The crash energy absorbing part according to (1), wherein the shape of any cross section that is perpendicular to the shock-absorbing direction has a curved portion, of which minimum curvature radius is not less than 7.0 mm, at not less than 30.0% of a circumferential length of the cross section, and wherein the shape of the cross section has a closed structure or has an opening at less than 15.0% of the circumferential length of the cross section.

(7)

The crash energy absorbing part according to (1), including 4 or more recess portions in a cross section perpendicular to the shock-absorbing direction, each of the recess portions being formed of a curved portion which is formed of a curve having a curvature radius of not less than 7.0 mm and not greater than 15 mm and which is inwardly recessed toward the center of the cross section.

(8)

The crash energy absorbing part according to (1), wherein the surface layer has yield stress of not less than 100 MPa and not greater than 1000 MPa.

(9)

The crash energy absorbing part according to (1), wherein a ratio $\rho_c/\rho_f$ of a density $\rho_c$ of the core layer and a density $\rho_f$ of each of the surface layers is not less than 1/300 and not greater than 1/2.

(10)

The crash energy absorbing part according to (1), wherein the sandwich metal sheet further includes a bonding layer between the surface layer and the core layer, and wherein the bonding layer has a shear modulus of not less than 50 MPa and not greater than 500 MPa.

Advantageous Effects of Invention

According to the present invention, a crash energy absorbing part which is light in weight, and in which collapsing deformation into a bellows shape occurs more stably even when an impact is applied in a direction crossing the shock-absorbing direction of the crash energy absorbing part, is provided. As a result, by using the crash energy absorbing part of the present invention, the collapsing deformation into the bellows shape occurs not only by an impact applied from a front direction but also by an impact applied from an oblique direction, and the crash energy is absorbed. Moreover, being formed of a light weight material, the part itself can be reduced in weight. Thus, the crash energy absorbing part of the present invention is effective for improving the fuel efficiency of an automobile or the like.

The crash energy absorbing part of the present invention has the above effects and therefore can be suitably used as a crash energy absorbing part not only for ordinary automobiles but also for transport vehicles such as each type of automobiles from light automobiles to large automobiles such as trucks and buses, trains, etc.

BRIEF DESCRIPTION OF DRAWINGS

FIG. 1 shows deformation steps in views (A) to (D) and shows a photograph after the deformation in view (E).

REFERENCE SIGNS LIST

Figure 1:
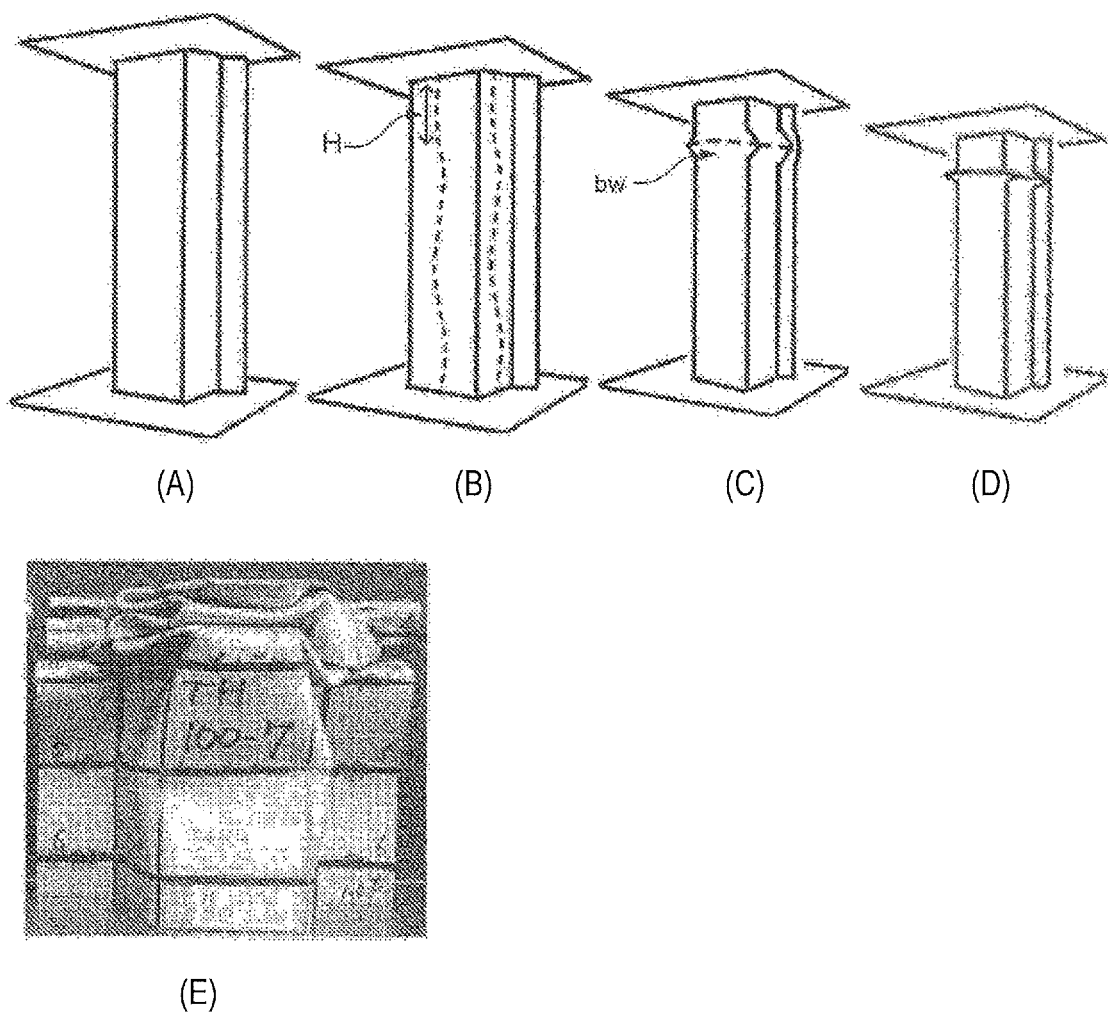
FIG. 1 is a schematic view showing typical deformation behavior when a crash load is applied in a shock-absorbing direction.
Figure 2:
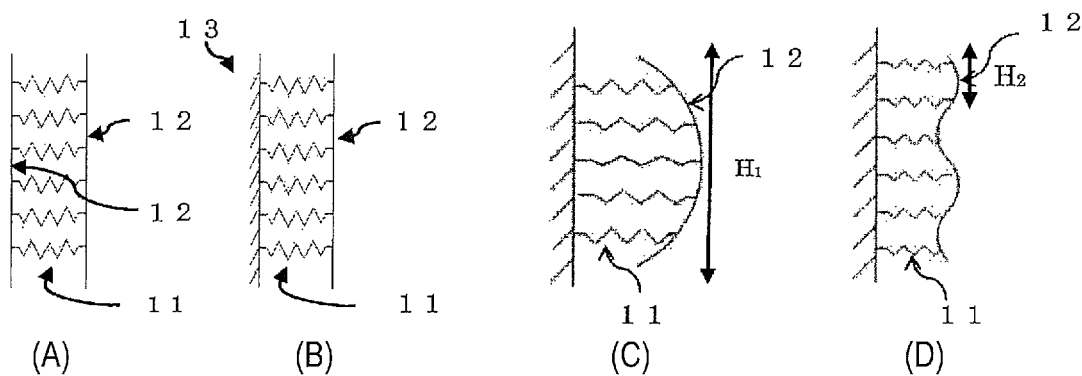
FIG. 2 is a schematic view showing deformation behavior of a surface layer and a core layer when a sandwich metal sheet is collapsingly deformed.

1 sandwich metal sheet
3A, 3B surface layer
5 core layer
7A, 7B bonding layer
11 elastic spring
12 metal sheet
21 end surface of opening
22 recess portion

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The crash energy absorbing part of the present invention is a crash energy absorbing part which absorbs crash energy when a crash load is applied to one of end portions in the shock-absorbing direction.

Moreover, the crash energy absorbing part of the present invention is made so that the collapsing deformation into the bellows shape will occur more stably and thereby absorbs crash energy even when a crash load is applied in a direction crossing the shock-absorbing direction. Here, in the present invention, the direction crossing the shock-absorbing direction is a direction that crosses the shock-absorbing direction by not less than 0 degree to less than 60 degrees. In addition, the direction at an angle of from greater than 0 degree to less than 60 degrees is defined as an oblique direction, and a crash load that is applied from the oblique direction is defined as an oblique load. When the angle is 60 degrees or greater, the deformation mode of the crash energy absorbing part due to the crash load may not be the collapsing deformation, but a deformation mode, in which the entirety of the part is folded by a lateral load (load that is perpendicular to the shock-absorbing direction), may mainly occur in most cases. Preferably, the crash energy absorbing part is arranged so that the crash load will be applied in a direction of not greater than 45 degrees, more preferably not greater than 30 degrees, with respect to the shock-absorbing direction. Thus, the ratio of the mode of collapsing deformation into the bellows shape is more increased, and the crash energy is absorbed further efficiently.

Figure 3:
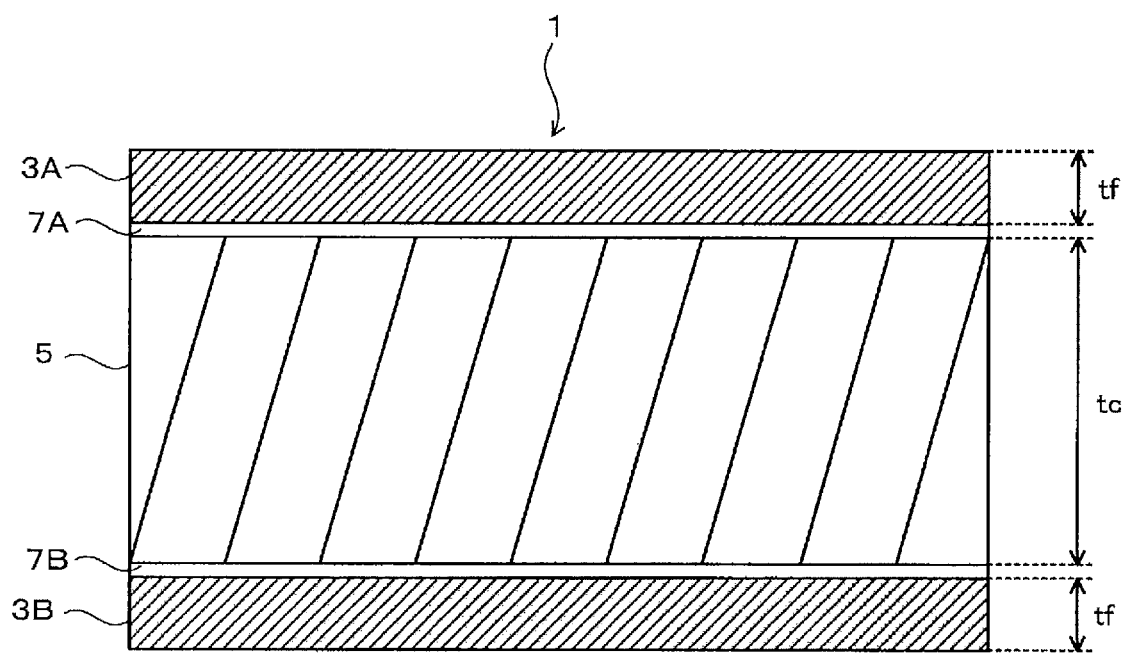
FIG. 3 is an explanatory drawing showing a structure of a crash energy absorbing part according to an embodiment of the present invention.

The structure of the crash energy absorbing part according to an embodiment of the present invention mentioned above will be described with reference to FIG. 3 hereinafter. FIG. 3 is an explanatory drawing showing the structure of the crash energy absorbing part according to an embodiment of the present invention.

(Structure of Sandwich Metal Sheet)

First, a sandwich metal sheet for constructing the crash energy absorbing part of the present invention will be described with reference to FIG. 3.

The sandwich metal sheet of the present invention is a sheet that is formed by laminating a metal sheet on each side surface of a core layer as a surface layer and bonding the metal sheet with a bonding material. The core layer of the sandwich metal sheet is a sheet-like layer having a density that is lower than the density of the metal sheet of the surface layer.

As shown in FIG. 3, a sandwich metal sheet 1 for constructing the crash energy absorbing part according to an embodiment of the present invention is a sandwich metal sheet, in which surface layers 3A and 3B, which are formed of a metal sheet, are laminated on both surfaces of a core layer 5, respectively, and are bonded with bonding layers 7A and 7B, respectively. The Young's modulus of the core layer 5 is smaller than the Young's modulus of each of the surface layers 3A and 3B.

The surface layers 3A and 3B can be formed of any metal sheet as long as the metal sheet has a Young's modulus that is greater than the Young's modulus of the core layer 5, preferably a metal sheet having a yield stress of not less than 100 MPa and not greater than 1000 MPa, and the metal sheet can be appropriately selected depending on the necessary absorbable amount of the crash energy. If the yield stress of the surface layer is less than 100 MPa, in order to obtain a sufficient absorbable amount of the crash energy, the thickness of the surface layer must be increased or a circumferential length of a cross section of the crash energy absorbing part must be increased, whereby the weight of the crash energy absorbing part is undesirably increased. On the other hand, if a metal sheet having a yield stress of greater than 1000 MPa is used as the surface layer, the metal sheet generally tends to be a thick metal sheet, and the weight is undesirably increased. Accordingly, in order to provide a shock-absorbing member which is lighter than the weight of a conventional one by greatly increasing the effect of reducing the weight of the crash energy absorbing part, a metal sheet having a yield stress of not less than 100 MPa and not greater than 1000 MPa is preferably used as the surface layer. Moreover, if the crash energy absorbing part is used for absorbing all crash energy in light collision only by itself so as to avoid damages to other connected members, deformation resistance of the crash energy absorbing part must be less than the deformation resistance of the connected members, and therefore, the yield stress of the surface layer is preferably not less than 100 MPa and not greater than 590 MPa. As the material for forming the surface layers 3A and 3B, specifically, a carbon steel, an aluminum alloy, a pure titanium, a titanium alloy, a magnesium alloy, or the like, may be used. In this case, the surface layers 3A and 3B are more preferably made of a carbon steel, an aluminum alloy, or the like, from the viewpoint of the production cost of the sandwich metal sheet 1. Moreover, the surface layers 3A and 3B may be subjected to each kind of plating treatments (for example, zinc plating or alloy plating) so as to have corrosion resistance and may be subjected to a publicly known surface treatment such as a chromate treatment, a phosphate treatment, an organic resin treatment, etc.

The thickness of each of the surface layers 3A and 3B is preferably not less than 0.2 mm. If the thickness of each of the surface layers 3A and 3B is less than 0.2 mm, the surface layers 3A and 3B tend to rupture in bending in a production of the crash energy absorbing part. Therefore, it is not preferable that the thickness of each of the surface layers 3A and 3B is less than 0.2 mm. On the other hand, if the thickness of each of the surface layers 3A and 3B is greater than 2.0 mm, the total thickness of the sandwich metal sheet 1 is increased, and the mass of the sandwich metal sheet 1 is undesirably increased. Therefore, the thickness of each of the surface layers 3A and 3B is preferably not greater than 2.0 mm from the viewpoint of the reduction in weight of the crash energy absorbing part.

The material for the core layer 5 is not specifically limited as long as the material has a Young's modulus that is smaller than the Young's modulus of the surface layers 3A and 3B, and a publicly known material can be appropriately selected and be used. As the material for forming the core layer 5, specifically, a metal material such as an aluminum alloy, titanium, copper, or the like, a non-metal material such as ceramics, resin, fiber-reinforced resin, paper, or the like, or a composite material, in which any of these materials are combined and composited, may be used. The composite material may include a composite material, in which voids of a honeycomb structural body are filled with foamed resin, and a composite material, in which a resin sheet and a network structural body are sequentially laminated, for example.

The sandwich metal sheet is preferably more reduced in weight in order to improve the fuel efficiency of an automobile or the like, which is mounted with the crash energy absorbing part constructed of the sandwich metal sheet. In the core layer which is suitably used for constructing such a sandwich metal sheet that is reduced in weight, a material, in which a publicly known structure having openings is applied in a metal material described above, an Fe alloy, or a stainless steel, is preferably used. The publicly known structure having openings may include a network structure, a honeycomb structure, a structure provided with holes that are formed by expanding or punching, a wave-shaped structure, a corrugated structure, a rolled structure, and a foamed structure, for example. In particular, a general-purpose material such as a metal mesh, an expanded metal, or a punched metal is more preferable because the general-purpose material can be easily produced. In such a structural body, the density ($\rho_c$) of the core layer can be easily controlled according to the purpose. For example, by providing multiple holes in a steel sheet so that the opening ratio will be 50%, the density of the punched metal can be controlled to be half of the density of the steel sheet.

The density ($\rho_c$) of the core layer may be any density not greater than the density ($\rho_f$) of the surface layer, and a ratio $\rho_c/\rho_f$ is preferably not less than 1/300 and not greater than 1/2. If the ratio $\rho_c/\rho_f$ is greater than 1/2, the difference of the weight between the sandwich metal sheet and an ordinary metal sheet is small. Therefore, the weight of the crash energy absorbing part that is constructed of the sandwich metal sheet is not greatly reduced, and there may be a probability that the effect for improving the fuel efficiency is not greatly obtained.

As the core layer, by which the ratio $\rho_c/\rho_f$ is smaller than 1/300, a foamed body (for example, foamed polystyrene that is foamed at an expansion ratio of 50), which is made of a light-weight material such as resin and contains numerous air layers, may be described. Since the core layer made of the foamed body contains numerous air layers, of which rigidity is very small, the rigidity of the sandwich metal sheet is made small, and there is a probability that an absorbable amount of the crash energy which is sufficient for the part to be used as a crash energy absorbing part is not obtained. Accordingly, the ratio $\rho_c/\rho_f$ is preferably not less than 1/300 and not greater than 1/2 in order to obtain a sufficient absorbable amount of the crash energy even in a violent collision, which generates impact that is equal to or greater than the impact generated in a light collision, and to increase the effect of reducing the weight.

Moreover, a material is more preferably selected so that the ratio $\rho_c/\rho_f$ will be not less than 1/20 and not greater than 1/2 because the material is easy to obtain and the production cost of the sandwich metal sheet can be decreased. For example, as for the material, by which the ratio $\rho_c/\rho_f$ will be not less than 1/20 and not greater than 1/2, a steel sheet and a metal structure such as a metal mesh may be used as the surface layer and the core layer, respectively, or an aluminum sheet and a resin may be used as the surface layer and the core layer, respectively.

In the sandwich metal sheet 1, the thickness ratio $t_c/t_f$ in which $t_f$ is the thickness of each of the surface layers 3A and 3B and $t_c$ is the thickness of the core layer 5, is not less than 2.0 and not greater than 7.0. As demonstrated in Examples described later, when the thickness ratio $t_c/t_f$ of each of the surface layers 3A and 3B and the core layer 5 of the sandwich metal sheet 1 is in this range, a buckling wavelength of the crash energy absorbing part according to an embodiment of the present invention is made small.

Specifically, if the thickness ratio $t_c/t_f$ of each of the surface layers 3A and 3B and the core layer 5 is less than 2.0, the effect of the deformation energy of the core layer 5 is small in the deformation energy in collapsing deformation in an axial direction, whereby the buckling wavelength cannot be made short. On the other hand, if the thickness ratio $t_c/t_f$ of each of the surface layers 3A and 3B and the core layer 5 is greater than 7.0, the core layer 5 has a great thickness relative to the thickness of each of the surface layers 3A and 3B, and the rigidity is greatly different between each of the surface layers 3A and 3B and the sandwich metal sheet 1. Therefore, in the crash energy absorbing part, there is a probability that the bonding layers 7A and 7B break and that the collapsing deformation into the bellows shape does not stably occur in the axial direction.

Moreover, in the sandwich metal sheet 1, the thickness ratio $t_c/t_f$ of each of the surface layers 3A and 3B and the core layer 5 may be preferably not less than 3.5 and not greater than 5.0. When the thickness ratio $t_c/t_f$ of each of the surface layers 3A and 3B and the core layer 5 of the sandwich metal sheet 1 is in this range, in the crash energy absorbing part according to an embodiment of the present invention, the collapsing deformation into the bellows shape occurs stably in the axial direction at a buckling wavelength that is more decreased. Specifically, when the thickness ratio $t_c/t_f$ of each of the surface layers 3A and 3B and the core layer 5 is not less than 3.5 and not greater than 5.0, the deformation energy of the core layer 5 and the deformation energy of each of the surface layers 3A and 3B are preferably balanced in collapsing deformation in the axial direction, whereby the buckling wavelength is made further short.

In the sandwich metal sheet 1, the ratio $E_c/E_f$ of the Young's modulus $E_f$ of each of the surface layers 3A and 3B and the Young's modulus $E_c$ of the core layer 5 may be not less than $1 \times 1^{-3}$ and not greater than $1 \times 10^{-1}$. When the ratio $E_c/E_f$ of the Young's modulus of each of the surface layers 3A and 3B and the Young's modulus of the core layer 5 of the sandwich metal sheet is in this range, the efficiency of absorption of the crash energy is improved in the crash energy absorbing part according to an embodiment of the present invention.

Specifically, if the ratio $E_c/E_f$ of the Young's modulus of each of the surface layers 3A and 3B and the Young's modulus of the core layer 5 of the sandwich metal sheet is less than $1 \times 10^{-3}$, the sandwich metal sheet 1 makes the buckling wavelength of the crash energy absorbing part short, but decreases an average load W in bucking deformation due to decrease in the value of Ec and thereby decreases the efficiency of absorption of the crash energy. Therefore, it is not preferable that the ratio $E_c/E_f$ is less than $1 \times 10^{-3}$. On the other hand, if the ratio $E_c/E_f$ of the Young's modulus of each of the surface layers 3A and 3B and the Young's modulus of the core layer 5 of the sandwich metal sheet is greater than $1 \times 10^{-1}$, since the Young's modulus Ec of the core layer 5 is great, shear deformation is unlikely to occur. Therefore, the behavior of the sandwich metal sheet is similar to the behavior of a metal sheet that is made of a single material in collapsing deformation in the axial direction, whereby the buckling wavelength cannot be made short. Accordingly, it is not preferable that the ratio $E_c/E_f$ is greater than $1 \times 10^1$. It should be noted that the Young's modulus of each of the surface layers 3A and 3B and the core layer 5 may be measured by a tensile test in accordance with ASTM-D638, or the like, for example.

The bonding layers 7A and 7B are formed by a publicly known bonding material. For example, the bonding layers 7A and 7B may be formed by an adhesive, a conductive adhesive, or a brazing material. As the adhesive, for example, an epoxy-based adhesive, an acrylic-based adhesive, or a urethane-based adhesive may be used. As the conductive adhesive, an adhesive, in which a specified amount of metal powder of aluminum, nickel, iron, or the like, is added to one of the adhesive described above, may be used. In addition, as the brazing material, soft solder (solder) that is made of an alloy of lead, tin, antimony, cadmium, zinc, or the like, a Ni—Cr based brazing material, or hard solder such as copper solder, gold solder, palladium solder, silver solder, or aluminum solder, may be used.

Among these bonding materials, when the core layer 5 is made of a conductive material, the bonding layers 7A and 7B are preferably formed of the conductive adhesive or the brazing material. In this case, the entirety of the sandwich metal sheet 1 has conductivity, whereby weldability is reliably obtained, and the sandwich metal sheet 1 can be joined by a method such as welding.

The bonding layers 7A and 7B preferably have a shear modulus of not less than 50 MPa and not greater than 500 MPa in order to control the shear deformation of the layer that is formed of the core layer 5 and the bonding layers 7A and 7B. If the bonding layers 7A and 7B have a shear modulus of less than 50 MPa, the bonding layers 7A and 7B may be shear-deformed excessively and may cause the surface layers 3A and 3B to be deformed independently of each other, whereby buckling deformation is difficult to occur stably. Therefore, it is not preferable that the bonding layers 7A and 7B have a shear modulus of less than 50 MPa. On the other hand, if the bonding layers 7A and 7B have a shear modulus of greater than 500 MPa, the shear deformation of the layer that is formed of the core layer 5 and the bonding layers 7A and 7B is difficult to occur, whereby there is a probability of increase in the buckling wavelength. Therefore, it is not preferable that the bonding layers 7A and 7B have a shear modulus of greater than 500 MPa. It should be noted that the shear modulus may be measured by a tensile shear test in accordance with JIS-K6850.

As a bonding material which has a shear modulus of greater than 500 MPa, a brazing material may be described. In the case of using the brazing material, since the brazing material must be melted by heating, a core layer capable of being bonded with the brazing material is made of a metal material which has a melting point that is equal to or higher than the melting point of the brazing material, or is formed of a structural body, in which a structure is provided to the metal material. Since this core layer is made of a material that is not easily shear-deformed compared to a non-metal material such as resin, as described above, a sandwich metal sheet using the brazing material may be deformed at a long buckling wavelength that is the same as the buckling wavelength of a metal sheet. On the other hand, in a sandwich metal sheet using a bonding material which has a shear modulus of less than 50 MPa, the bonding layers are shear-deformed excessively, and the metal sheets of the surface layers are deformed independently of each other. As a result, there is a probability that the sandwich metal sheet is deformed at a long buckling wavelength that is the same as the buckling wavelength of a metal sheet, depending on the material used for the core layer. Accordingly, in order to make the sandwich metal sheet so that deformation will occur more stably at a short buckling wavelength, the shear modulus of the bonding material is preferably not less than 50 MPa and not greater than 500 MPa.

Moreover, when the shear modulus of the bonding material is not less than 100 MPa and not greater than 300 MPa, the bonding layers tend to be shear-deformed at an appropriate degree, whereby the sandwich metal sheet is made so that deformation will occur more stably at a short buckling wavelength. As the bonding material having a shear modulus of not less than 100 MPa and not greater than 300 MPa, specifically, an epoxy-based adhesive, an acrylic-based adhesive, or a urethane-based adhesive may be described.

When the core layer is made of a conductive material, the bonding material is preferably a conductive adhesive from the viewpoint of obtaining the weldability of the sandwich metal sheet. Specifically, an adhesive, in which a specified amount of metal powder such as aluminum powder, nickel powder, iron powder, or the like, is added to an adhesive that is described later, may be used. In addition, in order to stably perform welding, the electric resistivity of the conductive adhesive is preferably not less than $1.0 \times 10^{-4}$ $\Omega \cdot cm$ and not greater than $1.0 \times 10^{-3}$ $\Omega \cdot cm$.

In the above description, the sandwich metal sheet 1 for constructing the crash energy absorbing part according to an embodiment of the present invention is described. Although the sandwich metal sheet 1 for constructing the crash energy absorbing part according to an embodiment of the present invention can be produced by using a publicly known laminating method, specifically, the sandwich metal sheet 1 may be produced by the following production method.

(Production Method for Sandwich Metal Sheet)

A bonding material (for example, adhesive) is applied on each surface of the core layer 5, and then the surface layer 3B, the core layer 5, and the surface layer 3A are laminated in this order and are pressurized at an ordinary temperature or by heating, whereby the sandwich metal sheet 1 is obtained. Alternatively, a bonding material is applied on one surface of each of the surface layers 3A and 3B, and then the surface layers 3A and 3B are laminated on the core layer 5 by putting the core layer 5 between the surfaces of the surface layers 3A and 3B which are applied with the bonding material. Then, the surface layer 3B, the core layer 5, and the surface layer 3A are pressurized at an ordinary temperature or by heating, whereby the sandwich metal sheet 1 is obtained.

Hereinafter, the effects of constructing a crash energy absorbing part by using the above sandwich metal sheet are described.

By laminating the core layer that has a smaller density than the surface layers, the sandwich metal sheet is light in weight compared to a metal sheet which has a thickness that is the same as the total thickness of the sandwich metal sheet. Therefore, the crash energy absorbing part that is constructed of the sandwich metal sheet is greatly reduced in weight relative to a crash energy absorbing part that is constructed of the metal sheet. As described above, the deformation of the crash energy absorbing part when a crash load is applied occurs such that buckling creases are generated and are folded. In such deformation, folding deformation, in which the deformation resistance (rigidity, strength) is proportional to the square or the cube of the total thickness, occurs mainly. Therefore, in the crash energy absorbing part that is constructed of the sandwich metal sheet, of which total thickness can be increased while the weight is not greatly increased, the absorbable amount of the crash energy is improved compared to a metal sheet which has the same weight as the sandwich metal sheet.

(Deformation Rate of Center Layer of Sandwich Metal Sheet)

Next, a deformation rate of a center layer of the sandwich metal sheet for constructing the crash energy absorbing part of the present invention is described.

The deformation rate of the center layer of the sandwich metal sheet for constructing the crash energy absorbing part is not less than 7.0% and not greater than 75.0%. Here, the center layer of the sandwich metal sheet is a layer other than the surface layers of the sandwich metal sheet. Specifically, the center layer is a layer formed of the core layer and the bonding layers. The deformation rate of the center layer of the sandwich metal sheet is an index of shear deformation of the center layer in collapsing deformation. Specifically, the deformation rate is a rate of decrease in flexural rigidity ($D_{exp}$: hereinafter called a measured rigidity), which is measured by an experiment, from a calculated rigidity ($D_{cal}$), which is calculated based on the structure of the sandwich metal sheet.

(Deformation rate of center layer of sandwich metal sheet)=$100 \times (D_{cal} - D_{exp})/D_{cal}$ Hereinafter, the reason for controlling the deformation rate of the center layer of the sandwich metal sheet so as to be not less than 7.0% and not greater than 75.0% is described.

Since the bonding layers are also greatly deformed in collapsing deformation, it is important to control the shear deformation of both of the core layer and the bonding layers. However, as described above, in the reports regarding the collapsing deformation of a crash energy absorbing part that is constructed of a sandwich metal sheet, the deformation of the core layer is strictly controlled, but the deformation of the bonding layers is not considered, whereby there were cases in which the collapsing deformation did not occur at a short buckling wavelength. Therefore, in order to make collapsing deformation occur more stably at a short buckling wavelength, it is necessary to appropriately understand and control the shear deformation of the center layer that is a combined layer of the core layer and the bonding layers of the sandwich metal sheet. Nevertheless, a test method for understanding the shear deformation of the center layer of the sandwich metal sheet in collapsing deformation has not been established. In view of this, in the present invention, the deformation rate of the center layer, which can be calculated from the difference between a measured rigidity that is obtained by a three-point bending test and a calculated rigidity that is estimated from the structure of the sandwich metal sheet, is used as an index for the shear deformation of the center layer of the sandwich metal sheet. The measured rigidity is a value which reflects the shear deformation of the center layer, whereas the calculated rigidity is a value which does not reflect the shear deformation of the center layer. Therefore, the difference between the measured rigidity and the calculated rigidity comes from the effect of the shear deformation of the center layer.

When the deformation rate of the center layer of the sandwich metal sheet is not less than 7.0% and not greater than 75.0%, the center layer is shear-deformed at an appropriate degree and is deformed by smaller deformation energy, whereby the sandwich metal sheet is deformed at a short buckling wavelength. Accordingly, the deformation rate of the center layer of the sandwich metal sheet is preferably not less than 7.0% and not greater than 75.0%.

On the other hand, if the deformation rate of the center layer is less than 7.0%, the center layer is difficult to shear-deform, whereby collapsing deformation occurs at a long buckling wavelength that is the same as the buckling wavelength of a single material. In addition, if the deformation rate of the center layer is greater than 75.0%, the center layer is shear-deformed excessively, whereby the surface layers are unlikely to be restricted by the center layer. As a result, the deformation energy is smaller when the surface layers are deformed at a long buckling wavelength rather than at a short buckling wavelength, and therefore, collapsing deformation occurs at a long buckling wavelength that is the same as the buckling wavelength of a single material. Accordingly, by controlling the deformation rate of the center layer of the sandwich metal sheet for constructing the crash energy absorbing part so as to be not less than 7.0% and not greater than 75.0%, the sandwich metal sheet is configured so that collapsing deformation will occur more stably at a short buckling wavelength.

Moreover, in the case of the sandwich metal sheet, since the degree of the flexural rigidity basically depends on the deformation rate of the center layer, the deformation rate of the center layer of the sandwich metal sheet is more preferably not less than 7.0% and not greater than 50.0%. When the deformation rate of the center layer is not greater than 50.0%, the amount of decrease in the rigidity of the sandwich metal sheet due to the shear deformation of the center layer is small, whereby collapsing deformation occurs at a short buckling wavelength while a sufficient absorbable amount of the crash energy is obtained.

(Shape of Crash Energy Absorbing Part)

Next, a preferable shape of the crash energy absorbing part of the present invention is described.

In the crash energy absorbing part of the present invention, any cross section that is perpendicular to the shock-absorbing direction has a curve, of which minimum curvature radius is not less than 7.0 mm, and has a curved portion at not less than 30.0% of the circumferential length of the cross section, and the cross section has a closed structure or has an opening at less than 15.0% of the circumferential length of the cross section. Here, the circumferential length and the length of the curved portion of any cross section that is perpendicular to the shock-absorbing direction of the crash energy absorbing part (hereinafter abbreviated as a cross section of the crash energy absorbing part) are values that are obtained by measuring a line (hereinafter called a center line) that connects the thickness center of the sandwich metal sheet. In this specification, it should be noted that a line having a curvature radius of not greater than 1 meter is defined as a curve, and a line having a curvature radius of greater than 1 meter is defined as a straight line. In addition, the minimum curvature radius of the curve in the cross section of the crash energy absorbing part is the minimum value among values that are obtained by measuring each of the curvature radiuses in the curve.

In the case in which the cross section of the crash energy absorbing part has an opening at less than 15.0% of the circumferential length of the cross section, the length of the opening is the length of the straight line which connects the ends of the opening, and the circumferential length of the cross section having the opening is the sum of the length of the straight line, which connects the ends of the opening, and the length of the center line of the cross section having the opening. Therefore, the ratio of the opening is a value that is obtained by dividing the length of the straight line, which connects the ends of the opening, by the circumferential length of the cross section having the opening. By measuring the outer circumference of any cross section that is perpendicular to the shock-absorbing direction of the crash energy absorbing part by a three-dimensional shape measuring device, and by considering the thickness of the metal sheet or the sandwich metal sheet, the circumferential length, the length of the curved portion, the curvature radius, and the length of the opening, of the crash energy absorbing part, can be determined.

Here, the reason that the collapsing deformation into the bellows shape is difficult to stably occur when an oblique load is applied to a crash energy absorbing part is described.

When an oblique load is applied to a crash energy absorbing part, local deformation tends to occur at a portion, to which the oblique load is applied first. In the case of an ordinary metal sheet, since the local deformation occurring at this time is a deformation which occurs at a long buckling wavelength, the portion which is deformed at the long buckling wavelength becomes a starting point, and deformation tends to occur such that the entirety of the crash energy absorbing part is bent. Thus, when an oblique load is applied, the collapsing deformation into the bellows shape does not stably occur in many cases.

Regarding an ordinary metal sheet, as described above, a technique for preventing the deformation, in which the entirety of the crash energy absorbing part is bent, by forming a complicated cross section so that the buckling wavelength will be decreased, is developed. On the other hand, in the case of the sandwich metal sheet, this technique is also effective, but the buckling wavelength can be made short and the deformation, in which the entirety of the crash energy absorbing part is bent, can be prevented by a simpler method, specifically, by providing a curved portion to the cross section of the crash energy absorbing part.

Specifically, the crash energy absorbing part of the present invention preferably has a curved portion at not less than 30.0% of the circumferential length of the cross section. If the curved portion is less than 30.0% of the circumferential length of the cross section, the length of the straight portion in the cross section of the crash energy absorbing part is increased, whereby there is a probability of increase in the buckling wavelength. The reason for this is described below.

In an ordinary metal sheet, the buckling wavelength corresponds to the length of the straight portion. In the sandwich metal sheet, since the sandwich metal sheet is deformed at a short buckling wavelength, the buckling wavelength does not correspond to, but depends on the length of the straight portion (that is, the buckling wavelength tends to be increased with the increase in the length of the straight portion). Thus, in order to make deformation occur at a short buckling wavelength, the curved portion should be made at not less than 30.0% of the circumferential length of the cross section so that the length of the straight portion will not be increased as much as possible. The curved portion is preferably made at not less than 50.0% of the circumferential length of the cross section in order to make deformation more stably occur at a short buckling wavelength. That is, a shape having a straight portion with a shorter length is preferably used as the cross sectional shape of the crash energy absorbing part. When the curved portion is made at not less than 50.0% of the circumferential length of the cross section, deformation occurs at a short buckling wavelength more stably, and collapsing deformation into the bellows shape occurs stably even when the crossing angle of the oblique load is large.

When the sandwich metal sheet and a metal sheet, which have the same degree of the absorbable amount of the crash energy, are compared, the thickness of the sandwich metal sheet is greater than the thickness of the metal sheet. Thus, in the case of the sandwich metal sheet, great strain is generated in the surface layer in forming the curved portion, and the surface layer tends to rupture. Therefore, the minimum curvature radius of the curved portion in the cross section of the crash energy absorbing part is preferably not less than 7.0 mm. If the minimum curvature radius of the curved portion is less than 7.0 mm, in bending for producing the crash energy absorbing part, great strain is generated in the surface layer, and the surface layer tends to rupture, whereby there may be cases in which a desired cross sectional shape cannot be obtained. Accordingly, the minimum curvature radius of the curved portion in the cross section of the crash energy absorbing part is preferably not less than 7.0 mm.

Figure 4:
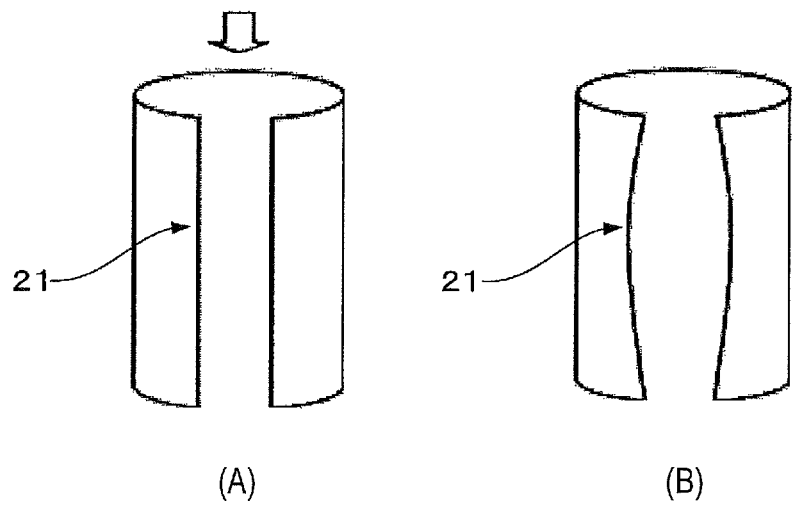
FIG. 4 is a schematic view of collapsing behavior of a crash energy absorbing part having an opening.

The crash energy absorbing part of the present invention has a cross section which has a closed structure or has an opening at less than 15.0% of the circumferential length of the cross section. In the case in which the cross sectional shape of the crash energy absorbing part is an open structure with an opening, free ends (unrestricted portions) are formed in the crash energy absorbing part. In the case of an ordinary metal sheet as shown in the view (A) in FIG. 4, when a crash load is applied in the direction indicated by the large arrow, the vicinity of a free end of an end surface 21 of an opening tends to be deformed at a long buckling wavelength such that the sheet is simply bent as shown in the view (B) in FIG. 4. Therefore, the vicinity of the opening (vicinity of the free end) is deformed at a long buckling wavelength in collapsing deformation, and the entirety of the part is bending-deformed from the deformed portion of the vicinity, whereby collapsing deformation into the bellows shape does not stably occur. On the other hand, in the sandwich metal sheet for constructing the crash energy absorbing part of the present invention, even a free end tends to be deformed at a short buckling wavelength, and therefore, collapsing deformation is likely to stably occur. However, if the ratio of the opening is 15.0% or greater, the entirety of the part tends to be bending-deformed from the opening, whereby there is a probability that collapsing deformation does not stably occur.

As described above, a crash energy absorbing part, which is made by forming the sandwich metal sheet into the shape of the crash energy absorbing part of the present invention, is configured so that collapsing deformation into the bellows shape will occur more stably even in a direction crossing the shock-absorbing direction and is light in weight.

Moreover, since the absorbable amount of the crash energy is expected to increase, the sandwich metal sheet is preferably formed so that the cross section of the crash energy absorbing part of the present invention will have 4 or more recess portions which are respectively formed of a curve with a curvature radius of not less than 7 mm. Here, the recess portion is a curved portion having a curvature radius of not less than 7 mm and not greater than 15 mm and having a curvature center at an outside of the cross section of the crash energy absorbing part. That is, the recess portion is a curved portion which is inwardly recessed (toward the center) in the cross section of the crash energy absorbing part.

The recess portion has high rigidity compared to the curved portion having a large curvature radius and compared to the straight portion. Therefore, by providing 4 or more recess portions to the cross section of the crash energy absorbing part, the absorbable amount of the crash energy is expected to increase greatly. On the other hand, if the number of the recess portions in the cross section of the crash energy absorbing part is less than 4, the effect for increasing the absorbable amount of the crash energy is not greatly obtained. However, if the crash energy absorbing part is formed so that 16 or more recess portions are provided to the cross section, the shape is very complicated, thereby causing a problem of increase in the forming cost, even though the absorbable amount of the crash energy is increased.

Next, specific examples of the shape of the present invention will be described.

The shape of the crash energy absorbing part of the present invention is not specifically limited as long as the crash energy absorbing part is formed as follows. That is, the cross section has at least a curve with a minimum curvature radius of not less than 7.0 mm and has a curved portion at not less than 30.0% of the circumferential length of the cross section, and that the cross section has a closed structure or has an opening at less than 15.0% of the circumferential length of the cross section.

Figure 5:
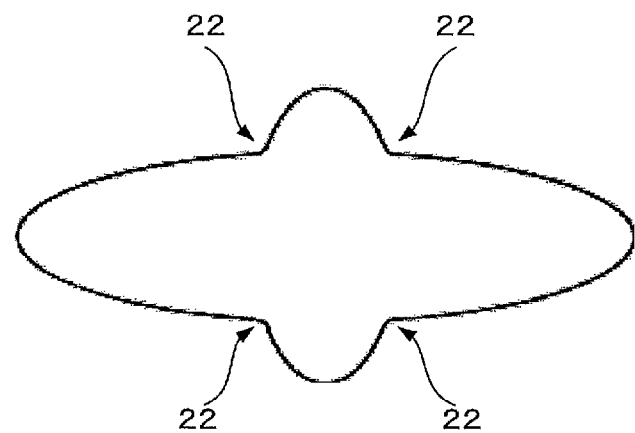
FIG. 5 is a schematic view showing a shape of a center line of a cross section of a crash energy absorbing part according to an embodiment of the present invention.

For example, the shape includes a circular shape, in which the curved portion is formed at 100% of the circumferential length of the cross section of the crash energy absorbing part, an ellipse shape, in which the curvature radius of the curve is continuously changed, a shape, in which an ellipse shape is mixed together as shown in FIG. 5, and shapes similar to these shapes.

Figure 6:
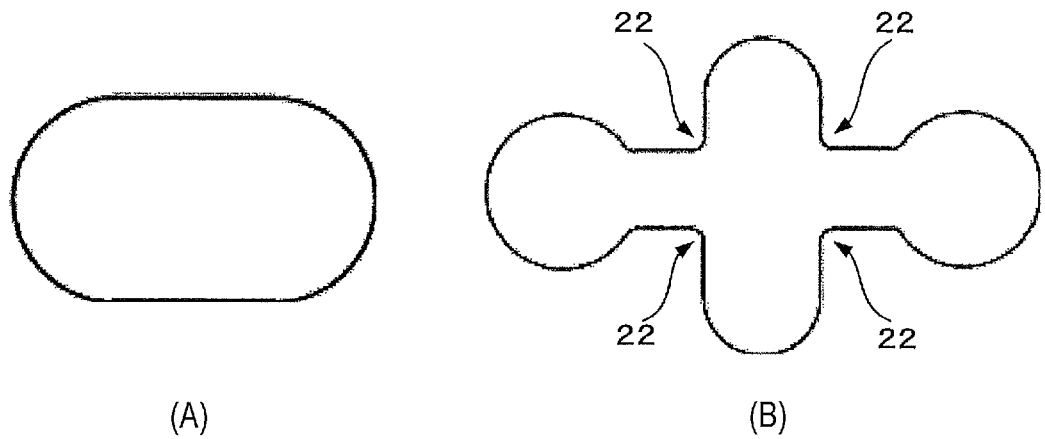
FIG. 6 is a schematic view showing a shape of a center line of a cross section of a crash energy absorbing part according to another embodiment of the present invention.

In the case in which the cross section of the crash energy absorbing part has a straight portion, a shape, in which a circular shape or an ellipse shape is connected by a straight line as shown in the views (A) and (B) in FIG. 6, and shapes similar to this shape, may be described. In the shape as shown in FIG. 5 and the view (B) in FIG. 6, since four recess portions 22 exist in the cross section of the crash energy absorbing part, the absorbable amount of the crash energy is expected to increase.

Figure 7:
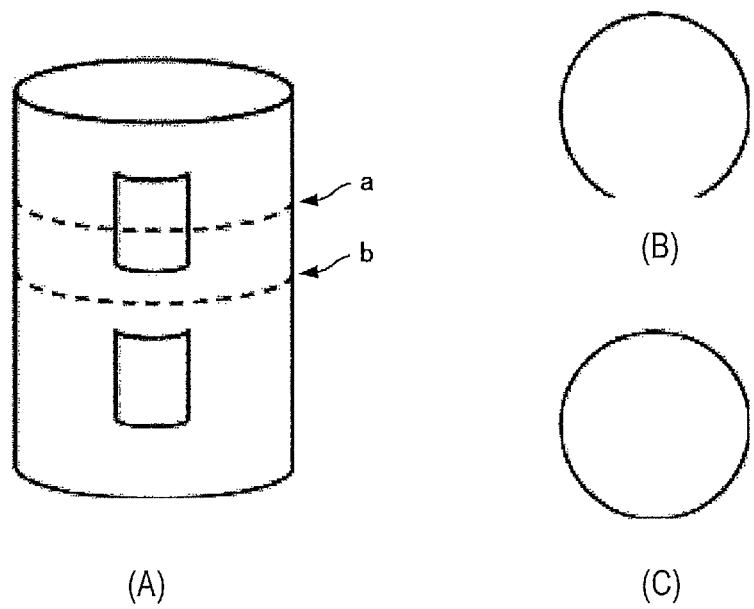
FIG. 7 is a schematic view of a crash energy absorbing part having openings at portions of the crash energy absorbing part.

In the case in which the cross section of the crash energy absorbing part has an opening at less than 15.0% of the circumferential length of the cross section, a shape, in which an opening of the crash energy absorbing part is continuously formed in the shock-absorbing direction, and a shape, in which an opening is intermittently formed in the shock-absorbing direction, may be described. In the case of the shape that is shown in the view (A) in FIG. 7, the cross section at the position "a" is shown in the view (B) in FIG. 7, and the cross section at the position "b" is shown in the view (C) in FIG. 7. In this case, since the opening is intermittently formed partially in the shock-absorbing direction, a material for constructing the crash energy absorbing part is removed, whereby the crash energy absorbing part is expected to be reduced in weight.

(Production Method for Crash Energy Absorbing Part)

Finally, a production method for a crash energy absorbing part according to an embodiment of the present invention is described.

The crash energy absorbing part can be produced by a publicly known method, and the production method is not specifically limited. For example, by performing any one or some of processing such as press bending, drawing, roll forming, and the like on a sandwich metal sheet, a crash energy absorbing part may be produced.

Advantageous Effects

The present invention provides a crash energy absorbing part which absorbs the crash energy when a crash load is applied to one of end portions in the shock-absorbing direction of the part. The crash energy absorbing part is constructed by forming a sandwich metal sheet, in which a surface layer that is formed of a metal sheet is laminated on each surface of a core layer and is bonded together. In the sandwich metal sheet, the center layer other than the surface layers has a deformation rate of not less than 7.0% and not greater than 75.0%. The deformation rate is a rate of decrease in flexural rigidity, which is measured by an experiment, from a calculated rigidity, which is calculated based on the structure of the sandwich metal sheet.

The crash energy absorbing part that is constructed of the sandwich metal sheet has a cross sectional shape which has at least a curve and has a curved portion at not less than 30.0% of the circumferential length of the cross section. Therefore, even when an oblique load is applied, the sandwich metal sheet is deformed at a short buckling wavelength, and collapsing deformation into the bellows shape tends to stably occur in the crash energy absorbing part.

By setting the thickness ratio $t_c/t_f$ of the thickness $t_f$ of each of the surface layers 3A and 3B and the thickness $t_c$ of the core layer 5 of the sandwich metal sheet for constructing the crash energy absorbing part at not less than 2.0 and not greater than 7.0, the buckling wavelength is made shorter, and the efficiency of absorption of the crash energy is improved.

It is not necessary to form the crash energy absorbing part of the present invention into a complicated shape, and the efficiency of absorption of the crash energy is improved by using the crash energy absorbing part with a simpler shape. Moreover, in the crash energy absorbing part of the present invention, there is no need to further decrease the ratio of the Young's modulus of each of the surface layers and the core layer of the sandwich metal sheet in order to make the buckling wavelength shorter. Therefore, the efficiency of absorption of the crash energy is improved without changing the strength of the crash energy absorbing part.

Furthermore, by providing an opening in the cross sectional shape at less than 15.0% of the circumferential length of the cross section, the weight is further reduced, and collapsing deformation stably occurs. By constructing the crash energy absorbing part by using the sandwich metal sheet, the member is further reduced in weight, and collapsing deformation into the bellows shape more stably occurs by strictly controlling the deformation rate of the center layer of the sandwich metal sheet. As a result, collapsing deformation into the bellows shape more stably occurs not only in a collision from a front direction but also in a collision from an oblique direction, whereby the crash energy is absorbed. Meanwhile, being formed of a light weight material, the part itself can be reduced in weight. Thus, a sufficient absorbable amount of the crash energy is obtained while the fuel efficiency is improved.

EXAMPLES

Hereinafter, the present invention is more specifically described by using examples.

First Example

Structures and Production Methods of Sandwich Metal Sheets Used

Sandwich metal sheets having surface layers and a core layer, which are shown in Table 1, were formed as examples of the present invention and comparative examples. The surface layer and the core layer was bonded together by using one of an adhesive (1) (base material: epoxy resin, coated amount: 200 g/m², shear modulus: 300 MPa), an adhesive (2) (modified polyolefin sheet, coated amount: 300 g/m², shear modulus: 220 MPa), an adhesive (3) (base material: urethane resin, coated amount: 200 g/m², shear modulus: 135 MPa), and an adhesive (4) (base material: urethane, soft material, coated amount: 200 g/m², shear modulus: 30 MPa).

Each of sandwich metal sheets A and H was formed by using the adhesive (1) as a bonding material and by laminating the bonding material, a core layer, the bonding material, and a surface layer on a surface layer in this order and heating them to 180° C. Then, the surface layers, the bonding materials, and the core layer, which were laminated, were thermocompressively bonded at a compressive force of 40 kgf/cm² (not greater than 2.92 MPa) for 20 minutes and were then cooled to an ordinary temperature, whereby each of the sandwich metal sheets was obtained.

Each of sandwich metal sheets B, D, E, G, I, K was formed by using the adhesive (2) as a bonding material. The bonding material, a core layer, the bonding material, and a surface layer were laminated on a surface layer in this order and were pressurized at 240° C. and at 40 kgf/cm² for 1 minutes, whereby each of the sandwich metal sheets was obtained.

Each of sandwich metal sheets C and F was formed by using the adhesive (3) as a bonding material. Surface layers, the bonding materials, and a core layer, which were laminated, were heated to 80° C. and were thermocompressively bonded at a compressive force of 40 kgf/cm² for 30 minutes, and they were then cooled to an ordinary temperature, whereby each of the sandwich metal sheets was obtained.

A sandwich metal sheet J was formed by using a brazing material (low-temperature brazing material of Sn—Pb based metal, melting point: 183° C., used amount: 15 g/m², shear modulus: greater than 500 MPa) as a bonding material. Surface layers, the bonding materials, and a core layer, which were laminated, were heated to 300° C. and were thermocompressively bonded at a compressive force of 40 kgf/cm² for 20 minutes, and they were then cooled to an ordinary temperature, whereby the sandwich metal sheet was formed.

A sandwich metal sheet L was formed by using the adhesive (4) as a bonding material. Surface layers, the bonding materials, and a core layer, which were laminated, were heated to 80° C. and were thermocompressively bonded at a compressive force of 40 kgf/cm² for 20 minutes, and they were then cooled to an ordinary temperature, whereby the sandwich metal sheet was faulted.

The metal sheet that was used as the surface layer of each of the sandwich metal sheets was one of an Al killed steel sheet (yield stress: 400 MPa), an Al alloy sheet (yield stress: 150 MPa), and a pure Al sheet (yield stress: 80 MPa).

The material that was used for the core layer of each of the sandwich metal sheets was one of a metal mesh (wire diameter: 0.6 mm, clearance between wires: 2 mm, density: 1.76 g/cm³), polypropylene (density: 0.94 g/cm³), a punched metal (rectangular holes, hole diameter: 4 mm, pitch: 4.5 mm, opening ratio: 79.0%, density: 1.63 g/cm³), foamed polyethylene having an expansion ratio of 2 times (expansion ratio of 2 times, density: 0.45 g/cm³), a cold-rolled steel sheet (density: 7.8 g/cm³), and foamed polystyrene having an expansion ratio of 50 times (expansion ratio of 50 times, density: 0.021 g/cm³).

In the comparative examples, a high tensile steel sheet of 980 MPa class (thickness: 1.0 mm) was used.

(Calculation Method of Deformation Rate of Center Layer of Sandwich Metal Sheet)

Each of the sandwich metal sheets was cut into a size of a width of 25 mm and a length of 60 mm, whereby each sample for a three-point bending test was obtained. The three-point bending test was performed in accordance with ASTM D790. Specifically, the three-point bending was performed in a condition in which a distance between fulcrums was 50 mm, a radius of a pressing element was 5 mm, a radius of a supporting stand was 5 mm, and a test speed was 5 mm/minute. An inclination (Pexp/δexp) in an elastic deformation region was calculated from a load-displacement curve that was obtained from the three-point bending test and was substituted into the formula (i), whereby rigidity Dexp of the sandwich metal sheet was calculated.

Then, a calculated rigidity Dcal was calculated from the formula (ii), and a deformation rate of the center layer of the sandwich metal sheet represented by the formula (iii) was determined.

$$D\mathrm{exp} = (P\mathrm{exp}/\delta\mathrm{exp}) \times (L^3/48) \qquad (\mathrm{i})$$

$$D\mathrm{cal} = Eb(H^2 - h^2)/12 \qquad (\mathrm{ii})$$

$$(\text{Deformation rate of center layer of sandwich metal sheet}) = 100 \times (D\mathrm{cal} - D\mathrm{exp})/D\mathrm{cal} \qquad (\mathrm{iii})$$

Here, "P" represents a load, "δ" represents a displacement, "L" represents a distance between fulcrums, "E" represents the Young's modulus of a surface layer, "b" represents a width of a sample, "H" represents the thickness of a sandwich metal sheet, and "h" represents the thickness of a core layer.

TABLE 1

| sandwich metal sheet | surface layer material | thickness (mm) | core layer material | thickness (mm) | bonding material | $t_c/t_f$ | $\rho_c/\rho_f$ | deformation rate of center layer (%) |
|---|---|---|---|---|---|---|---|---|
| A | Al killed steel sheet | 0.3 | metal mesh | 1.4 | adhesive (1) | 4.7 | 0.226 | 13.2 |
| B | Al killed steel sheet | 0.3 | metal mesh | 1.4 | adhesive (2) | 4.7 | 0.226 | 14.5 |
| C | Al killed steel sheet | 0.3 | metal mesh | 1.4 | adhesive (3) | 4.7 | 0.226 | 17.3 |
| D | Al alloy sheet | 0.3 | polypropylene | 1.4 | adhesive (2) | 4.7 | 0.348 | 24.5 |
| E | Al killed steel sheet | 0.3 | polypropylene | 1.4 | adhesive (2) | 4.7 | 0.121 | 45.6 |
| F | Al killed steel sheet | 0.3 | punched metal | 1.4 | adhesive (3) | 4.7 | 0.209 | 9.6 |
| G | Al killed steel sheet | 0.3 | foamed polyethylene (expansion ratio of 2 times) | 1.4 | adhesive (2) | 4.7 | 0.058 | 67.7 |
| H | Al killed steel sheet | 0.3 | cold-rolled steel sheet | 1.4 | adhesive (1) | 4.7 | 1 | 4.2 |
| I | Al killed steel sheet | 0.3 | foamed polystyrene (expansion ratio of 50 times) | 1.4 | adhesive (2) | 4.7 | 0.003 | 83.2 |
| J | Al killed steel sheet | 0.3 | punched metal | 1.4 | brazing | 4.7 | 0.209 | 5.8 |
| K | pure Al sheet | 0.3 | polypropylene | 1.4 | adhesive (2) | 4.7 | 0.348 | 24.5 |
| L | Al killed steel sheet | 0.3 | polypropylene | 1.4 | adhesive (4) | 4.7 | 0.121 | 80.7 |

(Shape Forming of Crash Energy Absorbing Parts to be Subjected to Experiment)

First, the shape forming methods of crash energy absorbing parts, which were subjected to a drop weight test in order to verify the effects of the crash energy absorbing part of the present invention, are described.

Figure 8:
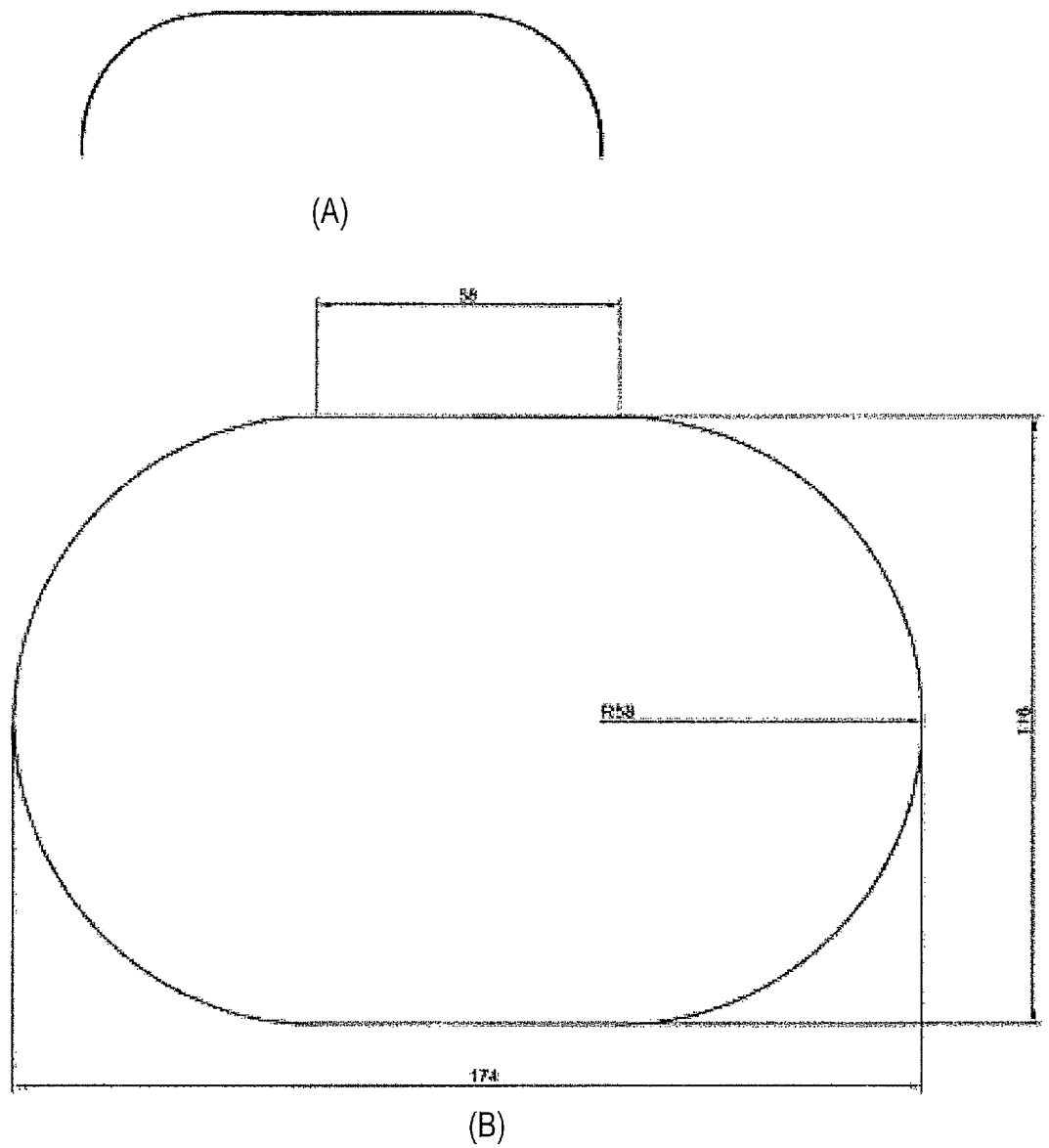
FIG. 8 is a schematic view showing a shape of a center line of a cross section of a crash energy absorbing part that is used in Examples.

A crash energy absorbing part with a shape "a" was formed as described below. That is, a metal sheet or a sandwich metal sheet was formed, and a half portion of the crash energy absorbing part having a cross section as shown in the view (A) in FIG. 8 was obtained. Then, ends of the half portions were bonded to each other by laser welding, whereby the crash energy absorbing part having a height of 200 mm and having a cross section as shown in the view (B) in FIG. 8 was formed.

Figure 9:
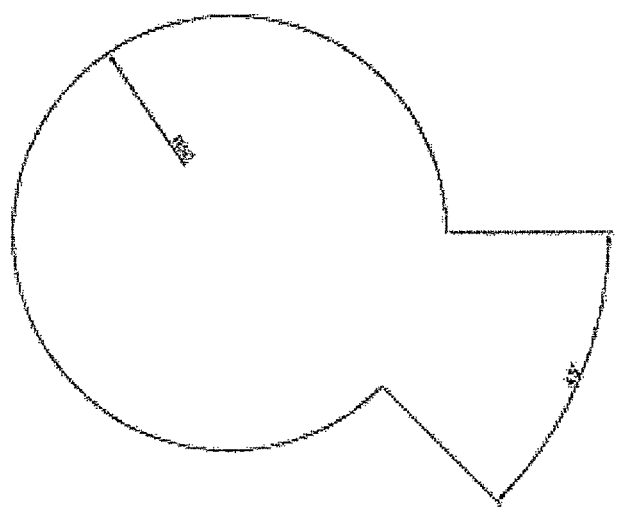
FIG. 9 is a schematic view showing a shape of a center line of a cross section of a crash energy absorbing part that is used in Examples.

As a crash energy absorbing part with a shape "b", by forming a sandwich metal sheet, a crash energy absorbing part having a height of 200 mm and having a cross section as shown in FIG. 9 was formed.

Figure 10:
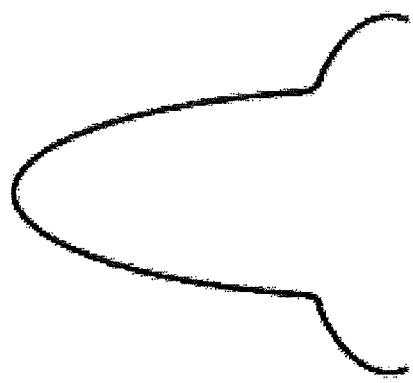
FIG. 10 is a schematic view showing a shape of a center line of a cross section of a crash energy absorbing part that is used in Examples.
Figure 10:
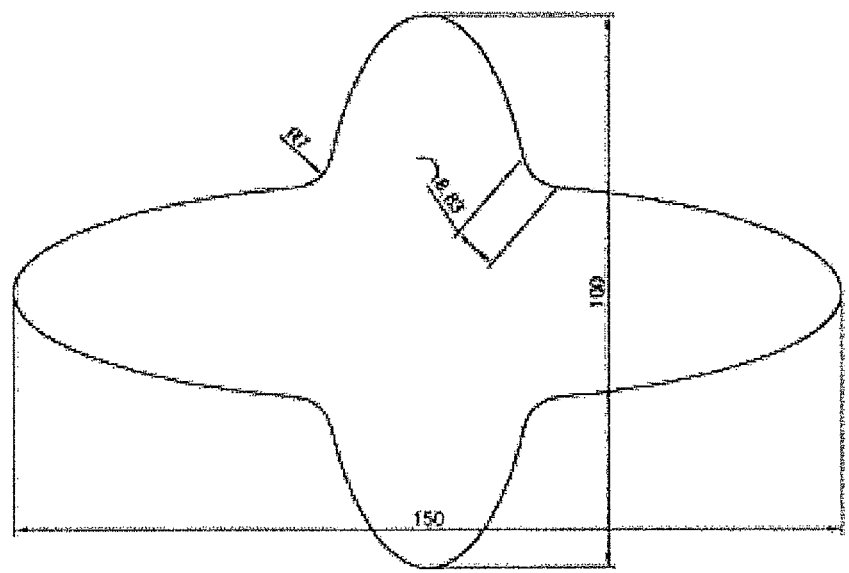

A crash energy absorbing part with a shape "c" was formed as described below. That is, a sandwich metal sheet was formed, and a half portion of the crash energy absorbing part having a cross section as shown in the view (A) in FIG. 10 was obtained. Then, ends of the half portions were bonded to each other by laser welding, whereby the crash energy absorbing part having a height of 200 mm and having a cross section as shown in the view (B) in FIG. 10 was formed.

Figure 11:
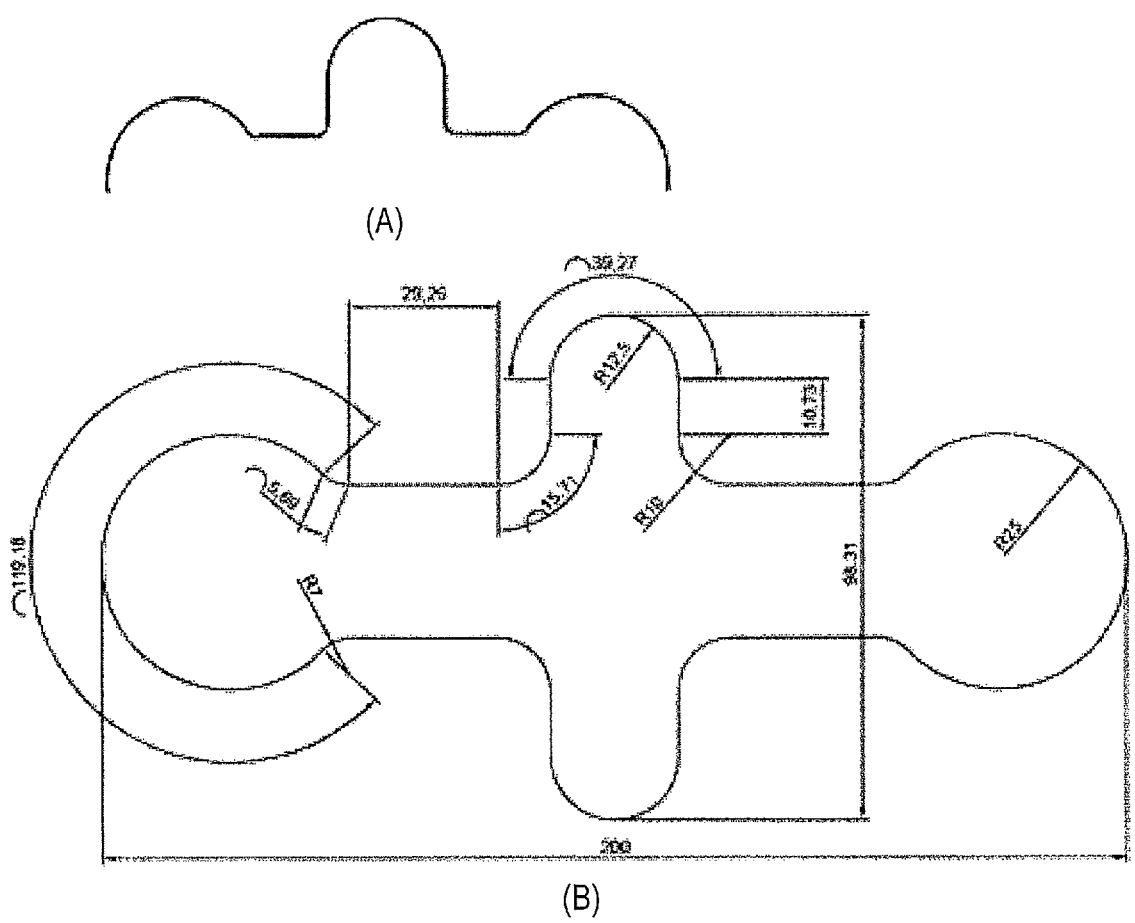
FIG. 11 is a schematic view showing a shape of a center line of a cross section of a crash energy absorbing part that is used in Examples.

A crash energy absorbing part with a shape "d" was formed as described below. That is, a sandwich metal sheet was formed, and a half portion of the crash energy absorbing part having a cross section as shown in the view (A) in FIG. 11 was obtained. Then, ends of the half portions were bonded to each other by laser welding, whereby the crash energy absorbing part having a height of 200 mm and having a cross section as shown in the view (B) in FIG. 11 was formed.

Figure 12:
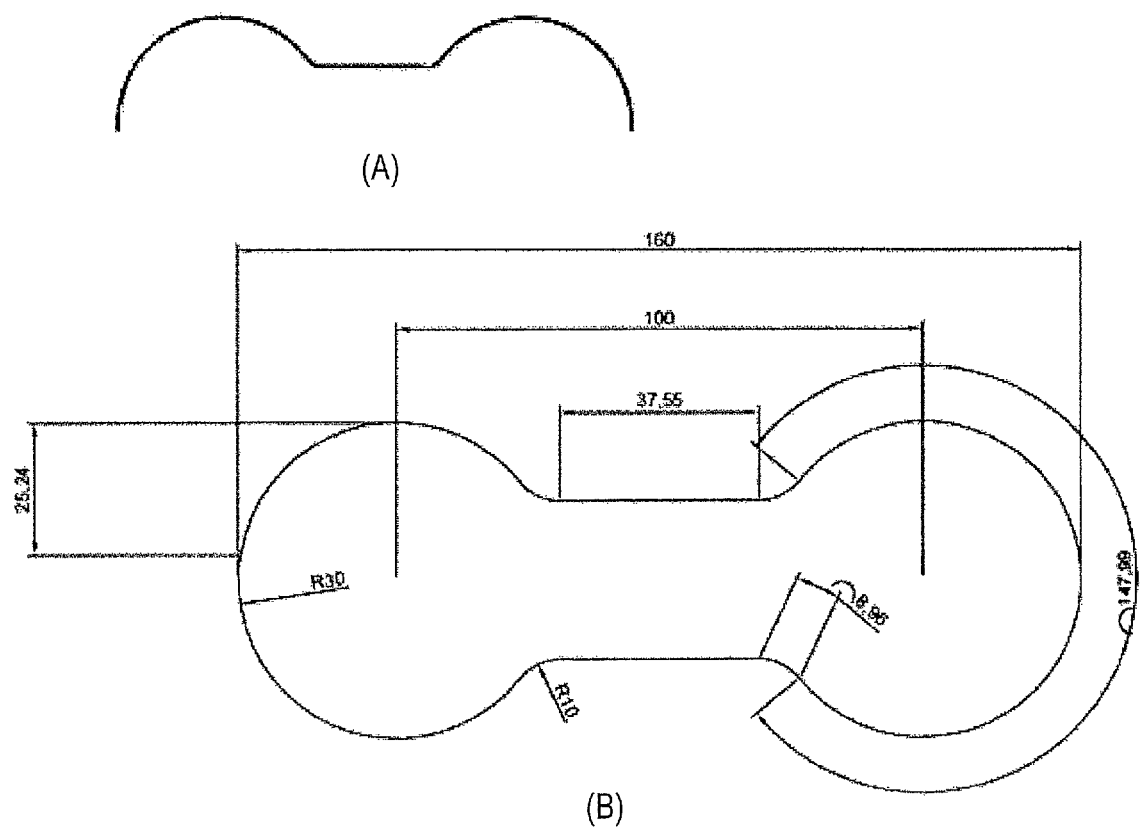
FIG. 12 is a schematic view showing a shape of a center line of a cross section of a crash energy absorbing part that is used in Examples.

A crash energy absorbing part with a shape "e" was formed as described below. That is, a metal sheet or a sandwich metal sheet was formed, and a half portion of the crash energy absorbing part having a cross section as shown in the view (A) in FIG. 12 was obtained. Then, ends of the half portions were bonded to each other by laser welding, whereby the crash energy absorbing part having a height of 200 mm and having a cross section as shown in the view (B) in FIG. 12 was formed.

Figure 13:
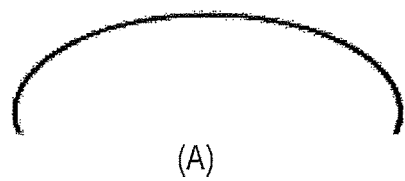
FIG. 13 is a schematic view showing a shape of a center line of a cross section of a crash energy absorbing part that is used in Examples.
Figure 13:
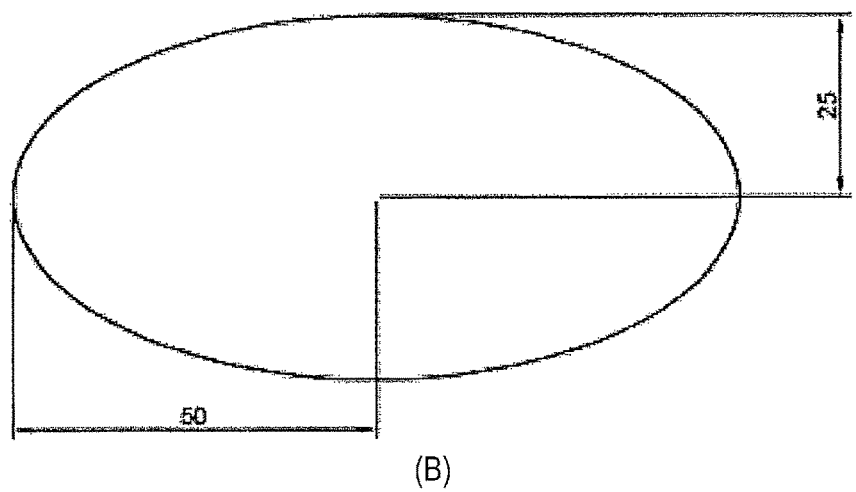

A crash energy absorbing part with a shape "f" was formed as described below. That is, a sandwich metal sheet was formed, and a half portion of the crash energy absorbing part having a cross section as shown in the view (A) in FIG. 13 was obtained. Then, ends of the half portions were bonded to each other by laser welding, whereby the crash energy absorbing part having a height of 200 mm and having a cross section as shown in the view (B) in FIG. 13 was formed.

Figure 14:
FIG. 14 is a schematic view showing a shape of a center line of a cross section of a crash energy absorbing part that is used in Comparative Examples.
Figure 14:
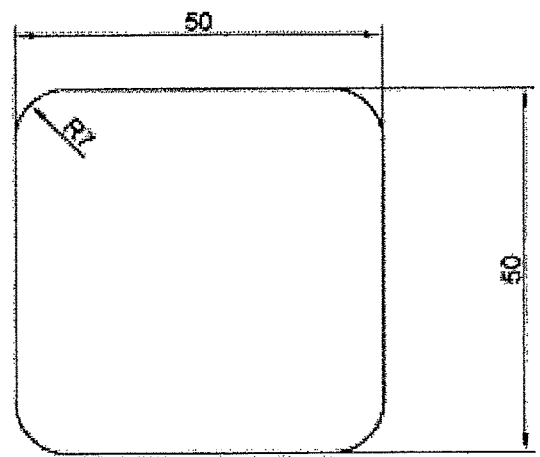

A crash energy absorbing part with a shape "g" was formed as described below. That is, a sandwich metal sheet was formed, and a half portion of the crash energy absorbing part having a cross section as shown in the view (A) in FIG. 14 was obtained. Then, ends of the half portions were bonded to each other by laser welding, whereby the crash energy absorbing part having a height of 200 mm and having a cross section as shown in the view (B) in FIG. 14 was formed.

Figure 15:
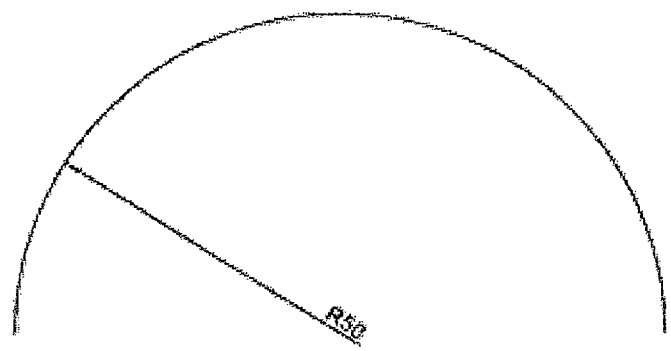
FIG. 15 is a schematic view showing a shape of a center line of a cross section of a crash energy absorbing part that is used in Comparative Examples.

As a crash energy absorbing part with a shape "h", by forming a sandwich metal sheet, a crash energy absorbing part having a height of 200 mm and having a cross section as shown in FIG. 15 was formed.

Figure 16:
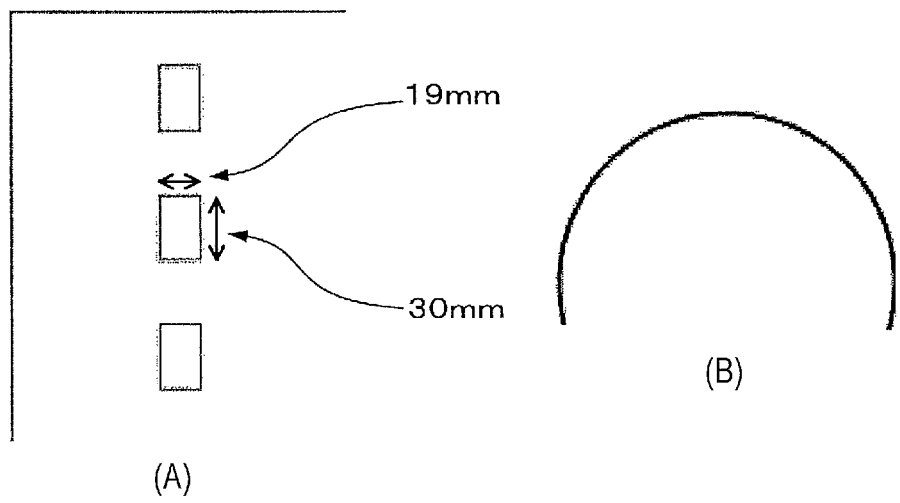
FIG. 16 is a schematic view showing a sandwich metal sheet that is used in Examples and showing a shape of a center line of a cross section of a crash energy absorbing part that is formed of the sandwich metal sheet.

A crash energy absorbing part with a shape "i" was formed as described below. That is, a sandwich metal sheet that was provided with openings as shown in the view (A) in FIG. 16 was formed, and a half portion of the crash energy absorbing part having a cross section as shown in the view (B) in FIG. 16 was obtained. Then, ends of the half portions were bonded to each other by laser welding, whereby the crash energy absorbing part (the view (A) in FIG. 7) having a height of 200 mm and partially having an open cross section as shown in the views (B) and (C) in FIG. 7 was formed.

Figure 17:
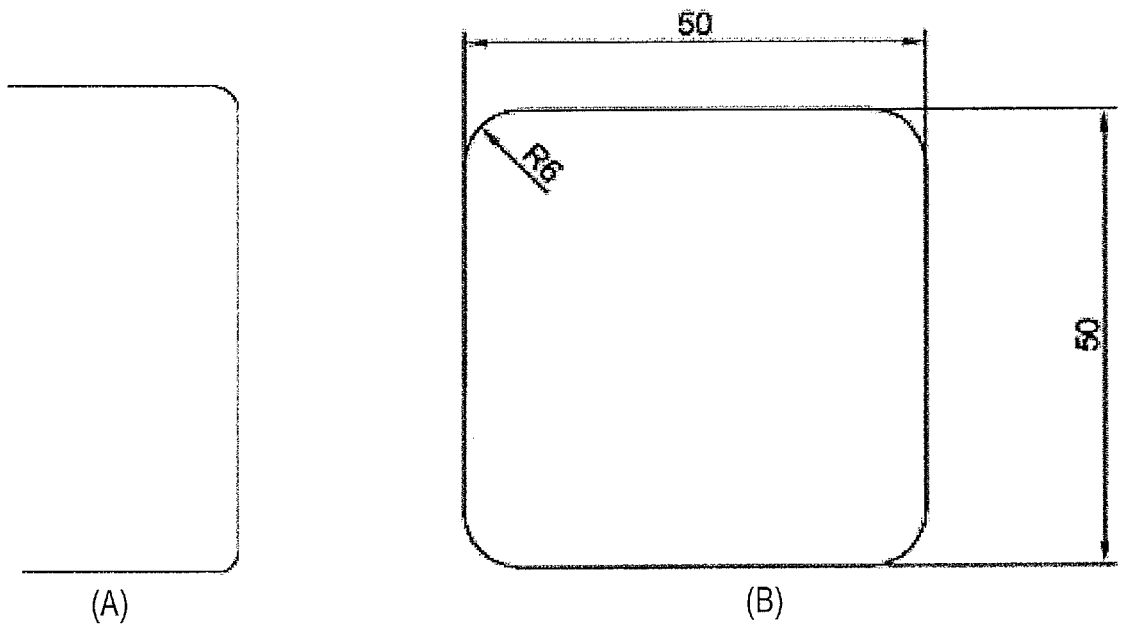
FIG. 17 is a schematic view showing a shape of a center line of a cross section of a crash energy absorbing part that is used in Comparative Examples.

A crash energy absorbing part with a shape "j" was formed as described below. That is, a sandwich metal sheet was formed, and a half portion of the crash energy absorbing part having a cross section as shown in the view (A) in FIG. 17 was obtained. Then, ends of the half portions were bonded to each other by laser welding, whereby the crash energy absorbing part having a height of 200 mm and having a cross section as shown in the view (B) in FIG. 17 was formed.

Figure 18:
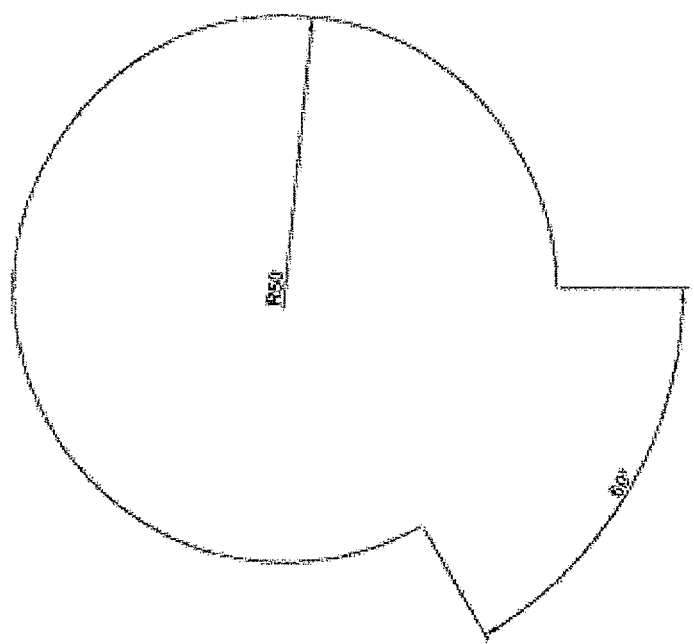
FIG. 18 is a schematic view showing a shape of a center line of a cross section of a crash energy absorbing part that is used in Comparative Examples.

As a crash energy absorbing part with a shape "k", by forming a sandwich metal sheet, a crash energy absorbing part having a height of 200 mm and having a cross section as shown in FIG. 18 was formed.

Figure 19:
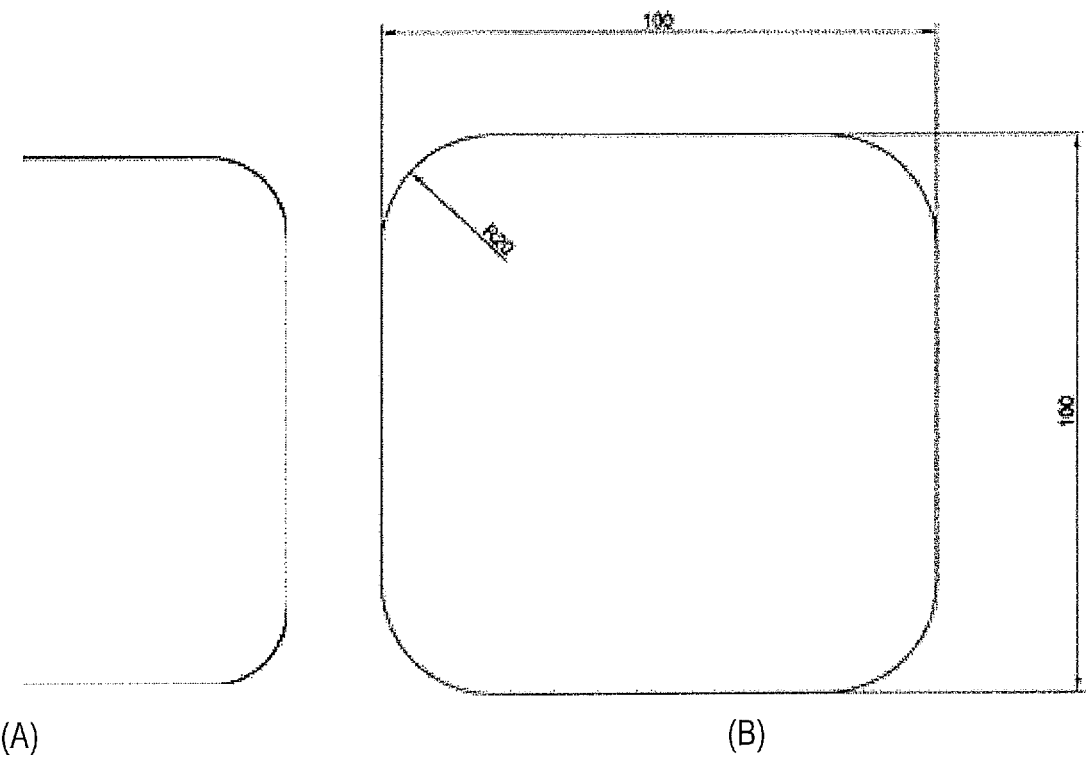
FIG. 19 is a schematic view showing a shape of a center line of a cross section of a crash energy absorbing part that is used in Examples.

A crash energy absorbing part with a shape "I" was formed as described below. That is, a sandwich metal sheet was formed, and a half portion of the crash energy absorbing part having a cross section as shown in the view (A) in FIG. 19 was obtained. Then, ends of the half portions were bonded to each other by laser welding, whereby the crash energy absorbing part having a height of 200 mm and having a cross section as shown in the view (B) in FIG. 19 was formed.

load applying condition 1, and the condition, in which the oblique load was applied from the depth direction, is called an oblique load applying condition 2.

(Evaluation of Collision Performance)

The amount En of absorption of the crash energy until a collapse of 100 mm was calculated from the load-displacement curve that was obtained from the drop weight test. Moreover, in order to evaluate the lightness of each of the parts, amount of absorption of the crash energy per unit mass

TABLE 2

| shape | circumferential length of cross section (mm) | length of curved portion (mm) | ratio of curved portion (%) | minimum curvature radius (mm) | structure | length of opening (mm) | ratio of opening (%) | recess portions |
| --- | --- | --- | --- | --- | --- | --- | --- | --- |
| a | 480 | 364 | 75.8 | 58 | closed structure | — | — | 0 |
| b | 313 | 274 | 100 | 50 | open structure | 38 | 12.2 | 0 |
| c | 396 | 331 | 100 | 7 | closed structure | — | — | 4 |
| d | 562 | 402 | 71.6 | 7 | closed structure | — | — | 8 |
| e | 406 | 331 | 81.5 | 7 | closed structure | — | — | 4 |
| f | 242 | 242 | 100 | 12.5 | closed structure | — | — | 0 |
| g | 375 | 87 | 23.4 | 14 | closed structure | — | — | 0 |
| h | 157 | 157 | 100 | 50 | open structure | 100 | 38.9 | 0 |
| i | 313 | 274 | 100 | 50 | partially open structure | 38 | 12.2 | 0 |
| j | 189 | 37 | 19.9 | 6 | closed structure | — | — | 0 |
| k | 311 | 261 | 100 | 50 | open structure | 50 | 16 | 0 |
| l | 365 | 125 | 34.4 | 20 | closed structure | — | — | 0 |

Next, the method of the drop weight test, which was performed in order to verify the effects of the crash energy absorbing part of the present invention, is described.

An end of a crash energy absorbing part, which was in a side that was opposite to an end of the crash energy absorbing part to be collided with a weight, was fixed with a jig, and a weight having a mass of 120 kg was made to freely fall down from a height of 3.5 meters and collided with the crash energy absorbing part in the shock-absorbing direction at a rate of 30 km/hour.

Figure 20:
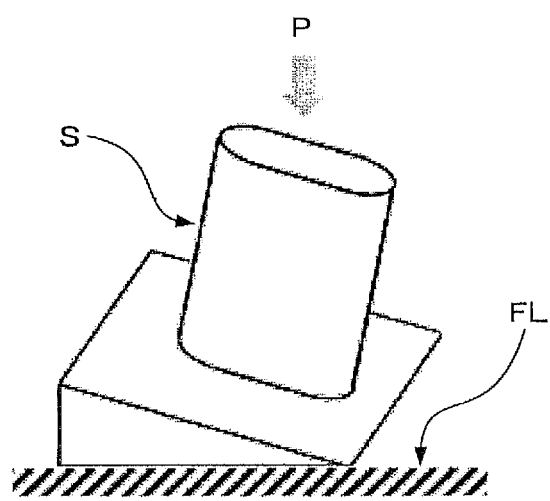
FIG. 20 is a schematic view showing a test method for applying an oblique load to a crash energy absorbing part.

In the case of applying an oblique load, as shown in FIG. 20, a crash energy absorbing part "S" was fixed on a stage so as to be tilted with respect to a floor surface FL by 10 degrees in the width direction, and the drop weight test was performed in the same manner as described above by applying a crash load "P" in a direction vertical to the floor surface. Thereafter, the crash energy absorbing part "S" was rotated by 90 degrees on the stage and was fixed so as to be tilted with respect to the floor surface FL by 10 degrees in the depth direction, and the drop weight test was performed by applying a crash load "P" in a direction vertical to the floor surface FL. Here, the outline of the cross section of the crash energy absorbing part was assumed as a rectangular shape, and a direction having a greater aspect ratio was defined as the width direction of the crash energy absorbing part, whereas a direction having a smaller aspect ratio was defined as the depth direction of the crash energy absorbing part. In addition, the condition, in which the oblique load was applied from the width direction, is called an oblique (En/w) was obtained by dividing the amount of absorption of the crash energy by the mass "w" of each of the parts, and the values of En/w were compared with each other. Also, the amount of absorption of the crash energy in the case of applying the oblique load was calculated in the same manner as described above.

It should be noted that the mark "excellent" represents stable occurrence of collapsing deformation into the bellows shape at a short buckling wavelength, and the mark "fair" represents occurrence of collapsing deformation into the bellows shape at a long buckling wavelength, in the deformation form column in each of Tables 3 and 4. In addition, the mark "poor" represents occurrence of deformation, in which the entirety of the part was bent into a V-shape from a portion that was deformed at a long buckling wavelength at an initial stage of the deformation. Here, the length of the buckling wavelength was evaluated based on the buckling wavelength of the crash energy absorbing part of the comparative example 4 that was constructed of the steel sheet. Then, the crash energy absorbing part was judged as having been collapsingly deformed at a short buckling wavelength when the buckling wavelength of the crash energy absorbing part that was subjected to the test was less than ⅔ of the buckling wavelength of the steel sheet.

Table 3 shows the results of the drop weight test in the case of applying the load in the shock-absorbing direction of the crash energy absorbing part.

TABLE 3

| | material | shape of crash energy absorbing part | En/w (J/g) | deformation form |
| --- | --- | --- | --- | --- |
| example 1 | laminated metal sheet A | a | 10.6 | excellent |
| example 2 | laminated metal sheet B | a | 10.3 | excellent |
| example 3 | laminated metal sheet C | a | 9.9 | excellent |
| example 4 | laminated metal sheet D | a | 8.5 | excellent |
| example 5 | laminated metal sheet E | a | 9.3 | excellent |
| example 6 | laminated metal sheet F | a | 9.6 | excellent |

TABLE 3-continued

|  | material | shape of crash energy absorbing part | En/w (J/g) | deformation form |
|---|---|---|---|---|
| example 7 | laminated metal sheet G | a | 7.9 | excellent |
| example 8 | laminated metal sheet A | e | 11 | excellent |
| example 9 | laminated metal sheet B | e | 10.6 | excellent |
| example 10 | laminated metal sheet C | e | 10.3 | excellent |
| example 11 | laminated metal sheet D | e | 8.9 | excellent |
| example 12 | laminated metal sheet K | e | 8.4 | excellent |
| example 13 | laminated metal sheet E | e | 9.6 | excellent |
| example 14 | laminated metal sheet F | e | 10 | excellent |
| example 15 | laminated metal sheet G | e | 8.3 | excellent |
| example 16 | laminated metal sheet A | b | 10.3 | excellent |
| example 17 | laminated metal sheet A | c | 10.8 | excellent |
| example 18 | laminated metal sheet A | d | 11.5 | excellent |
| example 19 | laminated metal sheet A | f | 10.2 | excellent |
| example 20 | laminated metal sheet A | i | 10.1 | excellent |
| example 21 | laminated metal sheet A | i | 9.8 | excellent |
| comparative example 1 | laminated metal sheet H | a | 6.2 | fair |
| comparative example 2 | laminated metal sheet I | a | 6.8 | fair |
| comparative example 3 | laminated metal sheet J | a | 6.9 | fair |
| comparative example 4 | high tensile steel | a | 6.6 | fair |
| comparative example 5 | laminated metal sheet L | e | 7.5 | fair |
| comparative example 6 | laminated metal sheet H | e | 6.6 | fair |
| comparative example 7 | laminated metal sheet I | e | 7.1 | fair |
| comparative example 8 | laminated metal sheet J | e | 7.3 | fair |
| comparative example 9 | high tensile steel | e | 6.9 | fair |
| comparative example 10 | laminated metal sheet A | g | 7.4 | fair |
| comparative example 11 | laminated metal sheet A | h | 5.3 | poor |
| comparative example 12 | laminated metal sheet A | j | — | — |
| comparative example 13 | laminated metal sheet A | k | 6.2 | poor |

Each of the crash energy absorbing parts of the examples 1 to 21 had a value of En/w of greater than 6.9 and was superior to the crash energy absorbing parts of the comparative examples 4 and 9 that were constructed of the high tensile steel (thickness: 1 mm, tensile strength: 980 MPa) in the crash energy absorbing performance and in lightness.

The crash energy absorbing parts of the examples 1, 8, 17, and 18 were constructed of the same materials and differed from each other only in the shape. When the examples 1, 8, 17, and 18 are compared with each other, the value of En/w of the example 18 was the greatest. Since the example 18 has a shape having eight recess portions, the amount of absorption of the crash energy of the example 18 is most likely to be increased. Thus, the value of En/w of the example 18 was great compared to the examples 1, 8, and 17.

The value of En/w of the example 7 was small compared to the examples 1 to 3, 5, and 6, of which the material and the thickness of the surface layer and the thickness of the core layer were the same as those of the example 7. Since the deformation rate of the center layer of the sandwich metal sheet G of the example 7 was such a great value as 67.7%, the center layer was shear-deformed, whereby the rigidity of the sandwich metal sheet was greatly decreased. As a result, in the example 7, the amount of absorption of the crash energy was decreased.

When the examples 11 and 12, which differed from each other only in the yield stress of the surface layer, are compared, the value of En/w of the example 11 was greater. Since the surface layer of the example 12 had such a small yield stress as 80 MPa, the amount of absorption of the crash energy was slightly decreased, whereby the value of En/w of the example 12 was smaller than the value of En/w of the example 11.

In each of the examples 1 to 21, collapsing deformation into the bellows shape stably occurred at a short buckling wavelength with respect to the crash load from the shock-absorbing direction of the crash energy absorbing part.

On the other hand, collapsing deformation into the bellows shape stably occurred at a long buckling wavelength in each of the comparative examples 1 to 10, and each of the comparative examples 11 and 13 was bending-deformed during the deformation. It should be noted that the drop weight test was not performed on the comparative example 12 because rupture of the surface layer was observed when the shape of the comparative example 12 was measured after the forming.

Since each of the comparative examples 1 and 6 had a center layer having such a small deformation rate as 4.2%, the center layer was hardly shear-deformed, whereby collapsing deformation into the bellows shape occurred at a long buckling wavelength.

Since each of the comparative examples 2 and 7 had a center layer having such a great deformation rate as 83.2%, the center layer was shear-deformed excessively, whereby collapsing deformation into the bellows shape occurred at a long buckling wavelength.

In the comparative example 5, since a bonding material having a very small shear modulus was used, the deformation rate of the center layer of the sandwich metal sheet was very great, whereby collapsing deformation into the bellows shape occurred at a long buckling wavelength.

In each of the pair of the example 6 and the comparative example 3 and the pair of the example 14 and the comparative example 8, although only the bonding material was different from each other among the structural elements for forming the sandwich metal sheet for constructing the crash energy absorbing part, the buckling wavelength in the collapsing deformation greatly differed from each other. In each of the comparative examples 3 and 8, the brazing material was used as the bonding material, and therefore, the center layer was shear-deformed at only a little degree, whereby collapsing deformation into the bellows shape occurred at a long buckling wavelength.

The comparative example 10 had a curved portion at less than 30% in the cross section of the crash energy absorbing part. As a result, the comparative example 10 was not deformed at a short buckling wavelength but was collapsingly deformed at a long buckling wavelength.

In each of the comparative examples 11 and 13, the ratio of the opening in the cross section of the crash energy absorbing part was not less than 15% and was great. As a result, bending occurred from the portion in the vicinity of the opening, and collapsing deformation did not occur.

Table 4 shows the results of the drop weight test in the case of applying the oblique load to the crash energy absorbing part of the present invention.

part was bending-deformed from this portion. As a result, the amount of absorption of the crash energy was greatly decreased.

Thus, in the crash energy absorbing part of the present invention, collapsing deformation more stably occurs in a collision from a front direction and also in a collision from an oblique direction, which are anticipated to occur in an automobile, whereby the crash energy is absorbed. Meanwhile, being formed of a light weight material, the part itself can be reduced in weight. Accordingly, both the collision safety and the fuel efficiency are improved.

TABLE 4

|  | oblique load applying condition 1 | | oblique load applying condition 2 | | applying load in shock-absorbing direction |
| --- | --- | --- | --- | --- | --- |
|  | En/w | deformation form | En/w | deformation form | En/w |
| example 1 | 10.2 | excellent | 10.3 | excellent | 10.6 |
| example 2 | 9.9 | excellent | 9.8 | excellent | 10.3 |
| example 3 | 9.4 | excellent | 9.4 | excellent | 9.9 |
| example 4 | 8.1 | excellent | 8.3 | excellent | 8.5 |
| example 5 | 9 | excellent | 8.9 | excellent | 9.3 |
| example 6 | 9.1 | excellent | 9.2 | excellent | 9.6 |
| example 7 | 7.5 | excellent | 7.3 | excellent | 7.9 |
| example 8 | 10.6 | excellent | 10.4 | excellent | 11 |
| example 9 | 10.3 | excellent | 10.1 | excellent | 10.6 |
| example 10 | 9.7 | excellent | 9.9 | excellent | 10.3 |
| example 11 | 8.5 | excellent | 8.6 | excellent | 8.9 |
| example 12 | 7.9 | excellent | 8.1 | excellent | 8.4 |
| example 13 | 9.4 | excellent | 9.3 | excellent | 9.6 |
| example 14 | 9.5 | excellent | 9.5 | excellent | 10 |
| example 15 | 7.7 | excellent | 8 | excellent | 8.3 |
| example 16 | 9.9 | excellent | 9.7 | excellent | 10.3 |
| example 17 | 10.6 | excellent | 10.3 | excellent | 10.8 |
| example 18 | 11.4 | excellent | 11 | excellent | 11.5 |
| example 19 | 10 | excellent | 9.8 | excellent | 10.2 |
| example 20 | 9.7 | excellent | 9.7 | excellent | 10.1 |
| example 21 | 9.6 | excellent | 9.4 | excellent | 9.8 |
| comparative example 1 | 2.8 | poor | 3 | poor | 6.2 |
| comparative example 2 | 3 | poor | 3.6 | poor | 6.8 |
| comparative example 3 | 3.4 | poor | 3.9 | poor | 6.9 |
| comparative example 4 | 3.5 | poor | 4 | poor | 6.6 |
| comparative example 5 | 4.8 | poor | 4.6 | poor | 7.5 |
| comparative example 6 | 3.9 | poor | 3.2 | poor | 6.6 |
| comparative example 7 | 3.5 | poor | 3.6 | poor | 7.1 |
| comparative example 8 | 3.8 | poor | 3.6 | poor | 7.3 |
| comparative example 9 | 3.3 | poor | 3.4 | poor | 6.9 |
| comparative example 10 | 3 | poor | 2.9 | poor | 7.4 |
| comparative example 11 | 2.9 | poor | 2.6 | poor | 5.3 |
| comparative example 13 | 3.6 | poor | 3 | poor | 6.2 |

In each of the examples 1 to 21, the value of En/w in each of the oblique load applying conditions 1 and 2 was approximately the same as the value of En/w in the case of applying the crash load in the shock-absorbing direction of the crash energy absorbing part. This was because the sandwich metal sheet was deformed at a short buckling wavelength, and collapsing deformation into the bellows shape stably occurred, even in the case of applying the oblique load, and therefore, there was almost no difference in the amount of absorption of the crash energy among the above cases.

On the other hand, in each of the comparative examples 1 to 11 and 13, the value of En/w in each of the oblique load applying conditions 1 and 2 greatly differed from the value of En/w in the case of applying the crash load in the shock-absorbing direction of the crash energy absorbing part. In each of the comparative examples 1 to 11 and 13, the crash energy absorbing part was deformed at a long buckling wavelength at a portion, at which the crash load was applied first, before the crash load was transmitted to the entirety of the crash energy absorbing part, whereby the entirety of the Second Example Production of Sandwich Metal Sheets First, surface layers and a core layer which are shown in Table 5 were laminated and were bonded together, whereby sandwich metal sheets were formed. The surface layer and the core layer were bonded together by using the bonding material shown in Table 5. The bonding material, the core layer, the bonding material, and the surface layer were laminated on the surface layer in this order, and they were heated to a temperature in the range of from 80° C. to 180° C., thermocompressively bonded at a compressive force of 40 kgf/cm$^2$ (3.92 MPa) for 20 to 30 minutes, cooled to an ordinary temperature, and subjected to air, whereby a sandwich metal sheet of each of examples and each of comparative examples was formed.

TABLE 5

| | surface layer | | core layer | | bonding material | | structure of sandwich metal sheet | |
|---|---|---|---|---|---|---|---|---|
| | material | thickness (mm) | material | thickness (mm) | type | shear modulus (Mpa) | $E_c/E_f$ | $t_c/t_f$ |
| example 22 | Al killed steel | 0.5 | polypropylene | 1 | adhesive 1 | 300 | $3.2*10^{-3}$ | 2 |
| example 23 | Al killed steel | 0.36 | polypropylene | 1.28 | adhesive 1 | 300 | $3.2*10^{-3}$ | 3.5 |
| example 24 | Al killed steel | 0.32 | polypropylene | 1.36 | adhesive 1 | 300 | $3.2*10^{-3}$ | 4.3 |
| example 25 | Al killed steel | 0.29 | polypropylene | 1.56 | adhesive 1 | 300 | $3.2*10^{-3}$ | 5.37931 |
| example 26 | Al killed steel | 0.32 | metal mesh | 1.36 | adhesive 1 | 300 | $5.5*10^{-2}$ | 4.3 |
| example 27 | Al killed steel | 0.32 | polypropylene | 1.36 | adhesive 2 | 135 | $3.2*10^{-3}$ | 4.3 |
| example 28 | Al killed steel | 0.32 | polypropylene | 1.36 | adhesive 3 | 30 | $3.2*10^{-3}$ | 4.3 |
| example 29 | Al killed steel | 0.32 | metal mesh | 1.36 | brazing | 650 | $5.5*10^{-2}$ | 4.3 |
| example 30 | Al killed steel | 0.32 | foamed polyethylene | 1.36 | adhesive 1 | 300 | $4.3*10^{-4}$ | 4.3 |
| comparative example 14 | Al killed steel | 0.32 | polypropylene | 0.36 | adhesive 1 | 300 | $3.2*10^{-3}$ | 1.1 |
| comparative example 15 | Al killed steel | 0.58 | polypropylene | 0.64 | adhesive 1 | 300 | $3.2*10^{-3}$ | 1.1 |
| comparative example 16 | Al killed steel | 0.32 | cold-rolled steel sheet | 1.36 | adhesive 1 | 300 | 1 | 4.3 |

In Table 5, the adhesive 1 is an adhesive which contains epoxy resin as a base material. The adhesive 1 was used for the bonding in the condition in which the coated amount was 200 g/m², the heating temperature was 180° C., the compressive force was 40 kgf/cm² (3.92 MPa), and the compressive bonding time was 20 minutes. The adhesive 2 is an adhesive which contains urethane resin as a base material. The adhesive 2 was used for the bonding in the condition in which the coated amount was 200 g/m², the heating temperature was 80° C., the compressive force was 40 kgf/cm² (3.92 MPa), and the compressive bonding time was 30 minutes. The adhesive 3 is an adhesive, in which elastic rubber is dispersed in the adhesive 2. The adhesive 3 was used for the bonding in the condition in which the coated amount was 200 g/m², the heating temperature was 80° C., the compressive force was 40 kgf/cm² (3.92 MPa), and the compressive bonding time was 20 minutes. In the brazing, a brazing material (low-temperature brazing material of Sn—Pb based metal, melting point: 183° C.) was used at the amount of 15 g/m². It should be noted that the shear modulus of the bonding material was measured by a tensile shear test in accordance with JIS-K6850.

In addition, in Table 5, polypropylene that was used for the core layer had a density of 0.94 g/cm³, and the metal mesh that was used for the core layer had a wire diameter of 0.6 mm and a clearance between the wires of 1.6 mm. As described above, $E_c$ represents the Young's modulus of the core layer, $E_f$ represents the Young's modulus of the surface layer, $t_c$ represents the thickness of the core layer, and $t_f$ represents the thickness of the surface layer.

(Collision Performance Evaluation Test)

Figure 21:
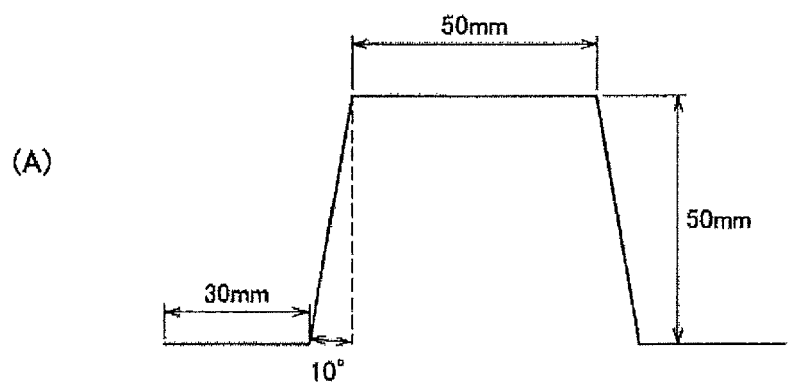
FIG. 21 is an explanatory drawing showing a shape of a crash energy absorbing part according to Second Example of the present invention.
Figure 21:
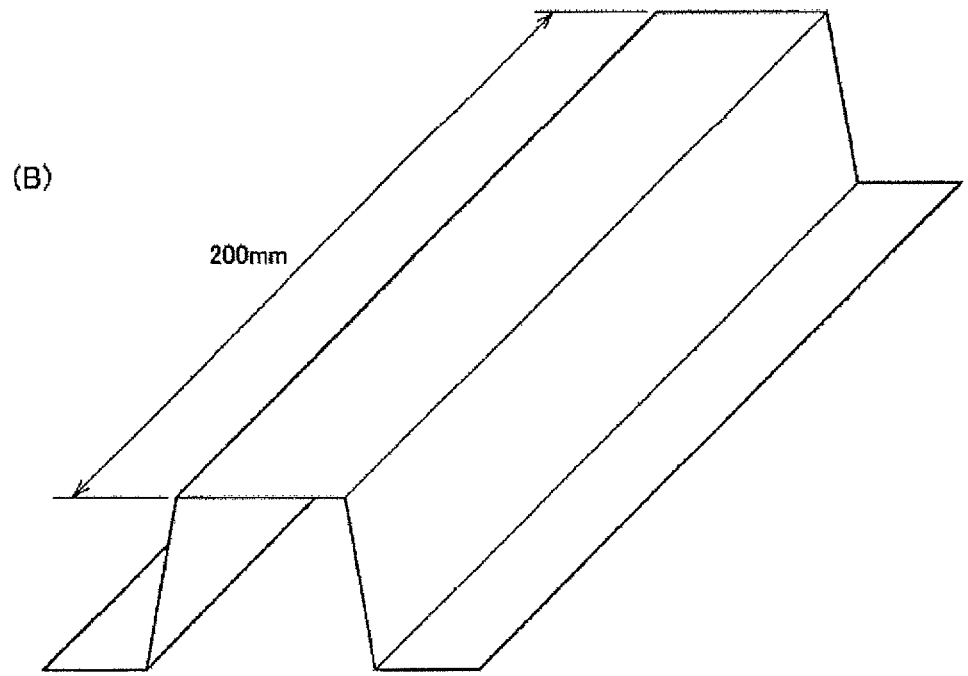

Next, collision performance of the crash energy absorbing part that was constructed of the sandwich metal sheet of each of the examples and each of the comparative examples formed as described above was evaluated. Specifically, the sandwich metal sheet of each of the examples and each of the comparative examples, which had the structure shown in Table 5, was used and was formed by bending by press brake, whereby a crash energy absorbing part having a hat type shape with a length of 200 mm as shown in FIG. 21 was formed. FIG. 21 is an explanatory drawing showing the shape of the crash energy absorbing part of the Second Example of the present invention. The view (A) in FIG. 21 is a cross sectional view which is taken along the cross section perpendicular to the direction of a ridge line that is the shock-absorbing direction, and the view (B) in FIG. 21 is an oblique view.

The collision performance of the formed crash energy absorbing part was evaluated by the drop weight test. Specifically, the formed crash energy absorbing part was arranged so that the direction of the ridge line would be the shock-absorbing direction, and an end which was in a side opposite to an end to be collided with the weight was fixed by a jig. Thereafter, a weight having a mass of 120 kg was made to freely fall down from the height of 3.5 meters and collided with the collision target end side of the crash energy absorbing part at a rate of 30 km/hour.

The amount of absorption of the crash energy until a collapse of 100 mm was calculated from the load-displacement curve that was obtained from the drop weight test. In order to evaluate the lightness of the crash energy absorbing part, amount of absorption of the crash energy per unit mass was obtained by dividing the amount of absorption of the crash energy by the mass of the part.

Moreover, an average buckling wavelength was calculated from the load-displacement curve that was obtained from the drop weight test. Specifically, a displacement, at which the load was the minimum, was measured in each load fluctuation period, and a buckling wavelength per period was calculated by subtracting the next displacement, at which the load was the minimum next, from the preceding displacement, at which the load was the minimum preceedingly. The buckling wavelength was calculated in each period in the same manner as described above, and the calculated buckling wavelengths were arithmetically averaged, whereby an average buckling wavelength was calculated. The results of evaluating the amount of absorption of the crash energy per unit mass and the average buckling wavelength, which were calculated as described above, are shown in Table 6.

It should be noted that in Table 6, the mark "excellent" in the buckling form column represents stable occurrence of collapsing deformation into the bellows shape, and the mark "fair" represents generation of a portion, at which the buckling wavelength was great, in the collapsing deformation occurring in the entirety of the part. In addition, the mark "poor" represents occurrence of deformation, in which the entirety of the part was bent into a horizontal V-shape from a portion that was buckled first at an initial stage of the deformation.

TABLE 6

| | total thickness (mm) | absorption of crash energy per unit weight (J/g) | average buckling wavelength (mm) | buckling form |
|---|---|---|---|---|
| example 22 | 2 | 6.3 | 15.6 | excellent |
| example 23 | 2 | 7.0 | 9.3 | excellent |
| example 24 | 2 | 7.7 | 7.1 | excellent |
| example 25 | 2.14 | 7.9 | 6.9 | fair |
| example 26 | 2 | 10.4 | 8.3 | excellent |
| example 27 | 2 | 7.4 | 7.0 | excellent |
| example 28 | 2 | 7.2 | 6.8 | excellent |
| example 29 | 2 | 9.2 | 10.3 | excellent |
| example 30 | 2 | 7.0 | 6.6 | excellent |
| comparative example 14 | 1 | 4.3 | 25.2 | fair |
| comparative example 15 | 1.8 | 4.6 | 23.6 | excellent |
| comparative example 16 | 2 | 3.2 | 46.2 | poor |

By referring to Table 6, the crash energy absorbing part of each of the examples 22 to 30 of the present invention had a shorter average buckling wavelength and a greater amount of absorption of the crash energy per unit mass compared to the crash energy absorbing part of each of the comparative examples 14 to 16. Specifically, in each of the comparative examples 14 and 15, since the value of $t_c/t_f$ was less than 2.0, the average buckling wavelength was increased, whereby the amount of absorption of the crash energy was decreased. In the comparative example 16, although the value of $t_c/t_f$ was within the range that is specified in the present invention, since the Young's modulus of the core layer and the Young's modulus of the surface layer were the same, the buckling deformation behavior was substantially the same as the buckling deformation behavior of a crash energy absorbing part that is constructed of a single material. Therefore, the average buckling wavelength was increased, whereby the amount of absorption of the crash energy was decreased.

In each of the examples 23, 24, and 26 to 30, since the value of $t_c/t_f$ was within the preferable range which is specified in an embodiment of the present invention, the average buckling wavelength was more decreased, whereby the amount of absorption of the crash energy per unit mass was further increased. On the other hand, in the example 22, since the value of $t_c/t_f$ was less than 3.5, the average buckling wavelength was longer than the average buckling wavelength of each of the examples 23, 24, and 26 to 30. In addition, in the example 25, since the value of $t_c/t_f$ was greater than 5.0, the buckling form column was marked with "fair".

In each of the examples 22 to 28 and 30, since the shear modulus of the bonding layer was within the preferable range which is specified in an embodiment of the present invention, the average buckling wavelength was further decreased. On the other hand, in the example 29, since the shear modulus of the bonding layer was greater than 500 MPa, the average buckling wavelength was great, and the amount of absorption of the crash energy was decreased, compared to the example 26, which was formed in the same conditions as in the example 29 except for the bonding layer.

In each of the examples 22 to 29, since the ratio $E_c/E_f$ of the Young's modulus of the core layer and the surface layer was within the preferable range which is specified in an embodiment of the present invention, the amount of absorption of the crash energy per unit mass was further increased. On the other hand, in the example 30, since the ratio $E_c/E_f$ of the Young's modulus of the core layer and the surface layer was less than $1 \times 10^{-1}$, the amount of absorption of the crash energy was decreased compared to the example 26, which was formed in the same conditions as in the example 30 except for the ratio $E_c/E_f$.

Figure 22:
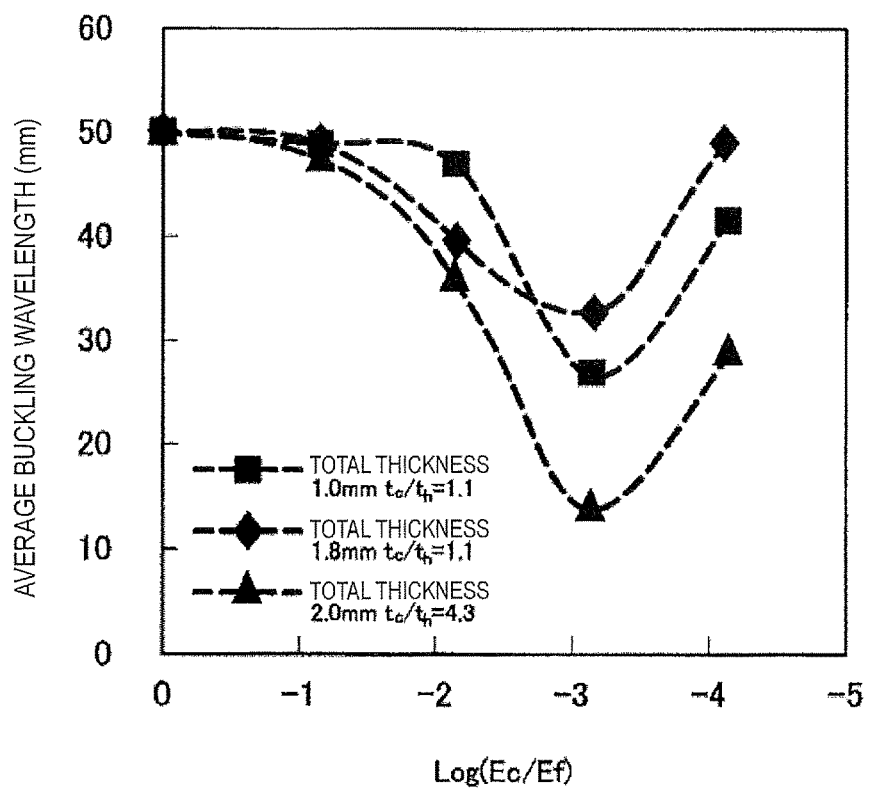
FIG. 22 is a graph showing an average buckling wavelength with respect to a value of $E_c/E_f$ of each of an example 24 and comparative examples 14 and 15.

Moreover, regarding the sandwich metal sheets of the example 24 and the comparative examples 14 and 15, the change in the average buckling wavelength with respect to the ratio $E_c/E_f$ of the Young's modulus of the surface layer and the core layer was evaluated by changing the ratio $E_c/E_f$ of Young's modulus of the surface layer and the core layer by simulation. In the simulation, the buckling inherent value was analyzed by using "Marc", which is a non-linear analysis program. The results of this evaluation are shown in FIG. 22. FIG. 22 is a graph showing the average buckling wavelength relative to the value of $E_c/E_f$ in the crash energy absorbing part of each of the example 24 and the comparative examples 14 and 15. In FIG. 22, the vertical axis shows an average buckling wavelength, and the horizontal axis shows a common logarithm value of $E_c/E_f$.

As shown in FIG. 22, in the example 24 (total thickness: 2.0 mm, $t_c/t_f$=4.3), the average buckling wavelength was short in each of the ratio $E_c/E_f$ of the Young's modulus of the surface layer and the core layer compared to the comparative example 14 (total thickness: 1.0 mm, $t_c/t_f$=1.1) and the comparative example 15 (total thickness: 1.8 mm, $t_c/t_f$=1.1). That is, in the example 24, since the value of $t_c/t_f$ was within the range which is specified in an embodiment of the present invention, the average buckling wavelength was shorter than the average buckling wavelength of each of the comparative examples 14 and 15 regardless of the ratio $E_c/E_f$ of the Young's modulus of the surface layer and the core layer.

Each of the example 24 and the comparative example 15 had a flexural rigidity of $9.6 \times 10^4$ N·cm$^2$, and the comparative example 14 had a flexural rigidity of $1.7 \times 10^4$ N·cm$^2$. That is, in the example 24, the average buckling wavelength was decreased without decreasing the strength (specifically, flexural rigidity) of the sandwich metal sheet compared to the comparative example 15.

Furthermore, by referring to FIG. 22, in the example 24, the average buckling wavelength was further decreased when the ratio $E_c/E_f$ of the Young's modulus of the surface layer and the core layer was within the range of not less than $1 \times 10^{-3}$ and not greater than $1 \times 10^{-1}$, compared to the comparative examples 14 and 15. Specifically, it is not preferable that the ratio $E_c/E_f$ of the Young's modulus of the surface layer and the core layer is greater than $1 \times 10^{-1}$ because the amount of decrease in the average buckling wavelength is small. On the other hand, it is not preferable that the ratio $E_c/E_f$ of the Young's modulus of the surface layer and the core layer is less than $1 \times 10^{-3}$ because the average load W in the buckling deformation is decreased due to decrease in the value of $E_c$, and the efficiency of absorption of the crash energy is decreased.

(Collision Performance Evaluation Test Regarding Shape of Crash Energy Absorbing Part)

Figure 23:
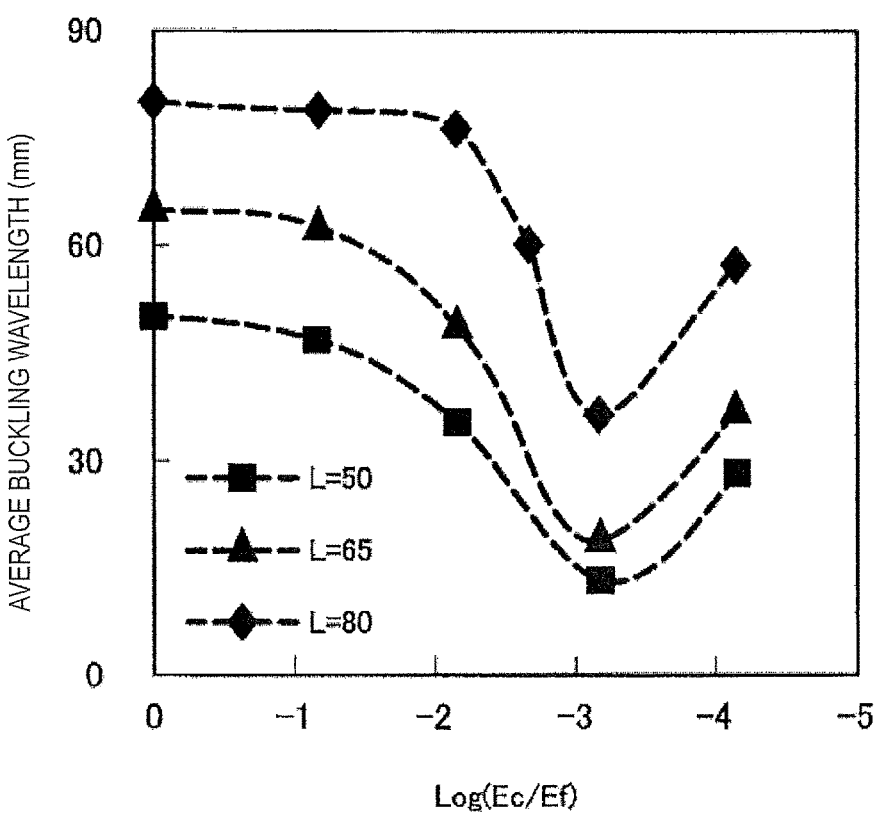
FIG. 23 is a graph showing an average buckling wavelength with respect to a shape of a crash energy absorbing part.

Next, the change in the average buckling wavelength with respect to the ratio $E_c/E_f$ of the Young's modulus of the surface layer and the core layer in a member having a hat type shape, in which a distance L between ridge lines was 50 mm, 65 mm, or 80 mm, was evaluated by simulation using the "Marc" in the same manner as described above. The results of this evaluation are shown in FIG. 23. FIG. 23 is a graph showing the average buckling wavelength corresponding to the shape of the crash energy absorbing part. In FIG. 23, the vertical axis shows an average buckling wavelength, and the horizontal axis shows a common logarithm value of $E_c/E_f$.

By referring to FIG. 23, when the distance L between the ridge lines of the crash energy absorbing part was not less than 50 mm and not greater than 80 mm, and the ratio $E_c/E_f$ of the Young's modulus was within the range of not less than $1\times10^{-3}$ and not greater than $1\times10^{-1}$, which is preferable in an embodiment of the present invention, the average buckling wavelength was more significantly decreased. On the other hand, it is not preferable that the distance L between the ridge lines is greater than 80 mm because the buckling wavelength is increased, and collapsing deformation into the bellows shape in the axial direction is difficult to stably occur. In addition, it is not preferable that the distance L between the ridge lines is less than 50 mm because the shape of the crash energy absorbing part is complicated, whereby the shape is restricted.

According to the results described above, in the crash energy absorbing part of an embodiment of the present invention, by constructing the crash energy absorbing part by using the following sandwich metal sheet, the buckling wavelength is made short, and the efficiency of absorption of the crash energy is improved. That is, in the sandwich metal sheet, a surface layer, which is formed of a metal sheet having a Young's modulus that is greater than the Young's modulus of a core layer, is laminated on each surface of the core layer and is bonding together, and the thickness ratio $t_c/t_f$ of the thickness $t_f$ of the surface layer and the thickness $t_c$ of the core layer is set at not less than 2.0 and not greater than 7.0.

In addition, according to the crash energy absorbing part of an embodiment of the present invention, the buckling wavelength can be made short without forming the crash energy absorbing part into a complicated shape, and therefore, the shape of the crash energy absorbing part can be more simplified. Moreover, in the crash energy absorbing part of an embodiment of the present invention, since it is not necessary to further decrease the ratio of the Young's modulus of the surface layer and the core layer of the sandwich metal sheet in order to further decrease the buckling wavelength, the efficiency of absorption of the crash energy can be improved without decreasing the strength of the crash energy absorbing part.

Furthermore, the crash energy absorbing part of an embodiment of the present invention is constructed of the sandwich metal sheet, in which the Young's modulus is small and the ratio of the core layer having a relatively small density is large, and is thereby more reduced in weight compared to a conventional crash energy absorbing part. Accordingly, the crash energy absorbing part of an embodiment of the present invention can be further reduced in weight.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

INDUSTRIAL APPLICABILITY

The present invention can be suitably used as a crash energy absorbing part not only for ordinary automobiles but also for transport vehicles such as each type of automobiles from light automobiles to large automobiles such as trucks and buses, trains, etc.

The invention claimed is:

1. A crash energy absorbing part configured to absorb crash energy when a crash load is applied to an end portion of the crash energy absorbing part in a shock-absorbing direction,
   the crash energy absorbing part is constructed by forming a sandwich metal sheet including surface layers, a core layer, and bonding layers between the surface layers and the core layer, in which each of the surface layers is formed of a metal sheet, and the surface layers are bonded to each surface of the core layer,
   wherein the bonding layers comprise an epoxy-based adhesive, an acrylic-based adhesive, or a urethane-based adhesive,
   wherein the bonding layers have a shear modulus of not less than 135 MPa and not greater than 500 MPa,
   wherein a center layer formed of the core layer and the bonding layers has a deformation rate of not less than 7.0% and not greater than 75.0%,
   wherein a shape of a cross section that is perpendicular to the shock-absorbing direction has a curved portion, of which minimum curvature radius is not less than 7.0 mm, at not less than 30.0% of a circumferential length of the cross section, and
   wherein the shape of the cross section has a closed structure or has an opening at less than 15.0% of the circumferential length of the cross section, wherein the deformation rate is defined by $100\times(Dcal-Dexp)/Dcal$
   wherein $Dcal=Eb(H^3-h^3)/12$ is the calculated rigidity of the sandwich metal sheet, Dexp is the measured flexural rigidity of the sandwich metal sheet, E is the Young's modulus of the surface layer, b is the width of the sandwich metal sheet, H is the thickness of the sandwich metal sheet, and h is the thickness of the core layer.

2. The crash energy absorbing part according to claim 1, wherein each of the surface layers is formed of a metal sheet which has a Young's modulus that is greater than the Young's modulus of the core layer, and
   wherein a thickness ratio $t_c/t_f$ of the thickness $t_f$ of each of the surface layers and the thickness $t_c$ of the core layer is not less than 2.0 and not greater than 7.0.

3. The crash energy absorbing part according to claim 1, wherein each of the surface layers is formed of a metal sheet which has a Young's modulus that is greater than the Young's modulus of the core layer, and
   wherein a thickness ratio $t_c/t_f$ of the thickness $t_f$ of each of the surface layers and the thickness $t_c$ of the core layer is not less than 3.5 and not greater than 5.0.

4. The crash energy absorbing part according to claim 1, wherein a ratio $E_c/E_f$ of the Young's modulus $E_f$ of each of the surface layers and the Young's modulus $E_c$ of the core layer is not less than $1\times10^{-3}$ and not greater than $1\times10^{-1}$.

5. The crash energy absorbing part according to claim 1, wherein the deformation rate of the center layer is not less than 7.0% and not greater than 50.0%.

6. The crash energy absorbing part according to claim 1, comprising 4 or more recess portions in a cross section perpendicular to the shock-absorbing direction, each of the recess portions being formed of a curved portion which is formed of a curve having a curvature radius of not less than 7.0 mm and not greater than 15 mm and which is inwardly recessed toward the center of the cross section.

7. The crash energy absorbing part according to claim 1, wherein the surface layer has yield stress of not less than 100 MPa and not greater than 1000 MPa.

8. The crash energy absorbing part according to claim 1, wherein a ratio $\rho c/\rho f$ of a density $\rho c$ of the core layer and a density $\rho f$ of each of the surface layers is not less than 1/300 and not greater than 1/2.

* * * * *